US010791794B2

(12) United States Patent
Bischoff

(10) Patent No.: US 10,791,794 B2
(45) Date of Patent: *Oct. 6, 2020

(54) SOLES FOR SPORTS SHOES

(71) Applicant: Reebok International Limited, London (GB)

(72) Inventor: Robert Andrew Bischoff, Canton, MA (US)

(73) Assignee: Reebok International Limited, London (GB)

( * ) Notice: Subject to any disclaimer, the term of this patent is extended or adjusted under 35 U.S.C. 154(b) by 16 days.

This patent is subject to a terminal disclaimer.

(21) Appl. No.: 16/260,535

(22) Filed: Jan. 29, 2019

(65) Prior Publication Data
US 2019/0150564 A1   May 23, 2019

Related U.S. Application Data

(63) Continuation of application No. 15/248,708, filed on Aug. 26, 2016, now Pat. No. 10,226,099.

(51) Int. Cl.
| | | |
|---|---|---|
| *A43B 13/20* | (2006.01) | |
| *A43B 13/18* | (2006.01) | |
| *A43B 13/02* | (2006.01) | |
| *A43B 13/04* | (2006.01) | |
| *A43B 5/00* | (2006.01) | |
| *A43B 1/00* | (2006.01) | |

(Continued)

(52) U.S. Cl.
CPC .......... *A43B 13/186* (2013.01); *A43B 1/0009* (2013.01); *A43B 5/00* (2013.01); *A43B 7/144* (2013.01); *A43B 13/026* (2013.01); *A43B 13/04* (2013.01); *A43B 13/125* (2013.01); *A43B 13/16* (2013.01); *A43B 13/188* (2013.01); *A43B 13/206* (2013.01); *B29D 35/0054* (2013.01); *B29D 35/0063* (2013.01); *B29D 35/0081* (2013.01); *B29D 35/122* (2013.01);

(Continued)

(58) Field of Classification Search
CPC ..... A43B 1/0009; A43B 13/18; A43B 13/186; A43B 13/20; A43B 13/206; A43B 21/28
USPC ............. 36/25 R, 28, 37, 30 A, 35 R, 31, 29
See application file for complete search history.

(56) References Cited

U.S. PATENT DOCUMENTS

| | | |
|---|---|---|
| 3,359,130 A | 12/1967 | Conrad |
| 3,987,134 A | 10/1976 | Shiina et al. |

(Continued)

FOREIGN PATENT DOCUMENTS

WO       2005066250       7/2005

OTHER PUBLICATIONS

*U.S. Appl. No. 15/248,708, "Final Office Action", dated Aug. 27, 2018, 6 pages.

(Continued)

*Primary Examiner* — Marie D Bays
(74) *Attorney, Agent, or Firm* — Kilpatrick Townsend & Stockton LLP

(57) ABSTRACT

Described are soles for a shoe having a region with a plurality of pellets, each pellet having a hollow core structure. The plurality of pellets are formed of a composite material comprising a base layer and an outer layer. The base layer is formed of a material having a first melting temperature, and the outer layer is formed of a material having a second melting temperature. The first melting temperature is greater than the second melting temperature, and the plurality of pellets are bonded through melting of the outer layers while the inner layers retain the hollow core structure without melting.

17 Claims, 26 Drawing Sheets

(51) Int. Cl.
*A43B 7/14* (2006.01)
*A43B 13/12* (2006.01)
*A43B 13/16* (2006.01)
*B29D 35/00* (2010.01)
*B29D 35/12* (2010.01)
*B29D 35/14* (2010.01)
*C08J 9/232* (2006.01)
*C08J 9/18* (2006.01)

(52) U.S. Cl.
CPC ......... *B29D 35/128* (2013.01); *B29D 35/142* (2013.01); *B29D 35/148* (2013.01); *C08J 9/18* (2013.01); *C08J 9/232* (2013.01); *C08J 2201/03* (2013.01); *C08J 2207/00* (2013.01); *C08J 2375/04* (2013.01)

(56) References Cited

U.S. PATENT DOCUMENTS

| | | |
|---|---|---|
| 4,970,807 A | 11/1990 | Anderie et al. |
| 5,092,060 A | 3/1992 | Frachey et al. |
| 5,564,202 A | 10/1996 | Hoppenstein |
| 5,587,231 A | 12/1996 | Mereer et al. |
| 5,626,657 A | 5/1997 | Pearce |
| 7,662,468 B2 | 2/2010 | Bainbridge |
| 7,926,204 B2 | 4/2011 | Ungari et al. |
| 7,946,060 B2 | 5/2011 | Rosenbaum |
| 8,650,690 B2 | 2/2014 | Ungari et al. |
| 9,781,970 B2 | 10/2017 | Wardlaw et al. |
| 10,226,099 B2 * | 3/2019 | Bischoff .............. A43B 13/186 |
| 2008/0066341 A1 | 3/2008 | Hottinger |
| 2009/0094858 A1 | 4/2009 | Ungari et al. |
| 2010/0173116 A1 | 7/2010 | Bainbridge |
| 2013/0291409 A1 | 11/2013 | Reinhardt et al. |
| 2016/0150855 A1 | 6/2016 | Peyton |
| 2018/0055144 A1 | 3/2018 | Bischoff |

OTHER PUBLICATIONS

*U.S. Appl. No. 15/248,708, "Non-Final Office Action", dated May 3, 2018, 8 pages.
*U.S. Appl. No. 15/248,708, "Notice of Allowance", dated Oct. 31, 2018, 6 pages.

* cited by examiner

SOLES FOR SPORTS SHOES

This is a continuation of U.S. patent application Ser. No. 15/248,708 filed Aug. 26, 2016, entitled SOLES FOR SPORTS SHOES (allowed), which is hereby incorporated in its entirety by this reference.

FIELD OF THE INVENTION

Background

Shoe soles and midsoles are provided with a variety of different properties that may, depending on the specific type of shoe, be realized to different extents. Some of the earliest midsoles were a thin rubber layer, but this material did not provide much in the way of comfort to the wearer.

To increase wearer comfort, soles and midsoles have been increasingly formed of material with voids formed therein to increase the cushioning feel, commonly referred to as foam materials. The foam soles and midsoles absorb impact and protect the wearer's feet during running. These materials compress on impact and expand back to its original shape in order to compress again before the next foot strike. These foam soles and midsoles are formed from polymer pellets containing a blowing agent (foamable or expandable pellets) that are then foamed when they enter the mold to form a foam midsole.

Foam soles and midsoles are generally made of foam plastic polymers, such as ethyl vinyl-acetate ("EVA") or polyurethane ("PU.") PU is usually denser and heavier than EVA with better durability, but PU midsoles usually lack the same energy of EVA midsoles. The EVA and PU midsole technology has changed in recent years with respect to weight, performance, and cosmetic geometry. There is a need for new foams that satisfies these demands.

Recently, shoe soles and midsoles have been produced using a newly developed material called expanded thermoplastic polyurethane ("eTPU"). The thermoplastic properties of the material allow the material to be formed into tiny beads, each bead enclosing tiny pockets of gas, with the beads bonded together to form a granular but closed plastic foam structure. WO 2005/066250 describes a shoe sole formed out of eTPU, but the properties of the sole are influenced by the eTPU continuously over the entire surface such that fine control over the sole properties is not possible. U.S. Publication No. 2013/0291409 describes a midsole formed of eTPU that incorporates a second region that is free of eTPU and is formed of a material that is stiffer than eTPU such that the second region is able to increase the stability of the eTPU to provide fine control over the sole properties.

The shoe soles and midsoles formed of eTPU have satisfied the need for a new and improved midsole material, but there is still a continuing drive for new foams that continue to reduce weight without impacting performance while providing a new look and feel. The present invention is lighter weight than eTPU and EVA and is a longer lasting foam. The material is also greener than EVA, and requires less processing energy, which improves efficiency and energy consumption.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a sole for a shoe comprises a region comprising a plurality of pellets, each pellet having a hollow core structure, wherein the plurality of pellets are formed of a composite material comprising a base layer and an outer layer, the base layer formed of a material having a first melting temperature, and the outer layer is formed of a material having a second melting temperature. The first melting temperature is greater than the second melting temperature, and the plurality of pellets are bonded through melting of the outer layers while the inner layers retain the hollow core structure without melting.

In certain embodiments, the region is positioned in a heel area of the sole.

In some embodiments, the first melting temperature may be at least 40° C. higher than the second melting temperature.

In some embodiments, the sole also comprises a second region bordering at least a portion of a side surface of the region comprising the plurality of pellets, wherein the second region is free of the plurality of pellets. The second region may be configured to leave at least a portion of a top surface of the region comprising the plurality of pellets unbordered. In further embodiments, the second region is configured to leave at least a portion of a bottom surface of the region comprising the plurality of pellets unbordered. In some embodiments, the second region forms a pocket that partially surrounds the region comprising the plurality of pellets.

According to some embodiments, the pellets comprise an inner diameter of approximately 1.6 mm to 1.8 mm.

According to certain embodiments of the present invention, a sole for a shoe comprises a first region comprising a plurality of pellets, each pellet having a hollow core structure, wherein the plurality of pellets are formed of a composite material comprising a base layer and an outer layer, wherein the pellets are bonded through melting of the outer layers. The sole also comprises a second region bordering at least a portion of a side surface of the first region, wherein the second region is free of the plurality of pellets.

In certain embodiments, the first region is positioned in a heel area of the sole. In further embodiments, the second region is arranged around an outer rim of the sole.

According to some embodiments, the base layer is formed of a material having a first melting temperature, and the outer layer is formed of a material having a second melting temperature, wherein the first melting temperature is greater than the second melting temperature.

In some embodiments, the inner layers of the pellets retain the hollow core structure without melting.

In certain embodiments, the first melting temperature is at least 40° C. higher than the second melting temperature.

According to some embodiments, the second region is configured to leave at least a portion of a top surface of the first region unbordered. In further embodiments, the second region is configured to leave at least a portion of a bottom surface of the first region unbordered. In some embodiments, the second region forms a pocket that partially surrounds the first region.

According to some embodiments, the pellets comprise an inner diameter of approximately 1.6 mm to 1.8 mm.

According to certain embodiments of the present invention, a method of forming a shoe sole comprises introducing a plurality of pellets into a mold, each pellet having a hollow core structure, the plurality of pellets formed of a composite material comprising a base layer and an outer layer, the base layer formed of a material having a first melting temperature, and the outer layer having a second melting temperature, wherein the first melting temperature is greater than the second melting temperature. The method further comprises introducing steam into the mold, and joining the pellets to one another to form at least a region of the shoe sole.

In some embodiments, the mold is pressurized after introduction of the plurality of pellets. In further embodiments, the plurality of pellets are introduced into a pressurized mold. The mold may be pressurized to a range of 0.4 bar to 1.0 bar. In certain embodiments, the method further comprises cooling the mold.

BRIEF DESCRIPTION OF THE DRAWINGS

In the following detailed description, embodiments of the invention are described referring to the following figures.

DETAILED DESCRIPTION

Figure 1:
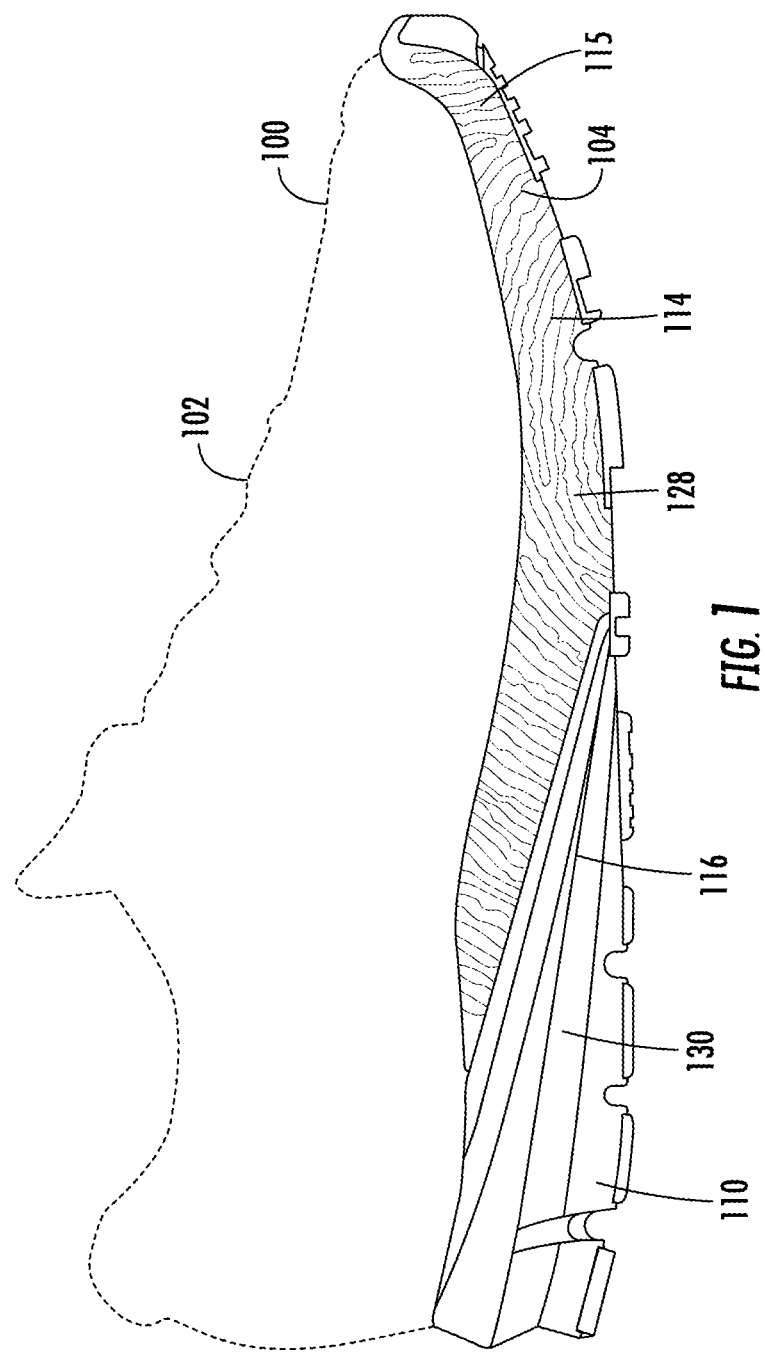
FIG. 1 is a side view of a shoe with a sole, according to certain embodiments of the present invention.
Figure 2:
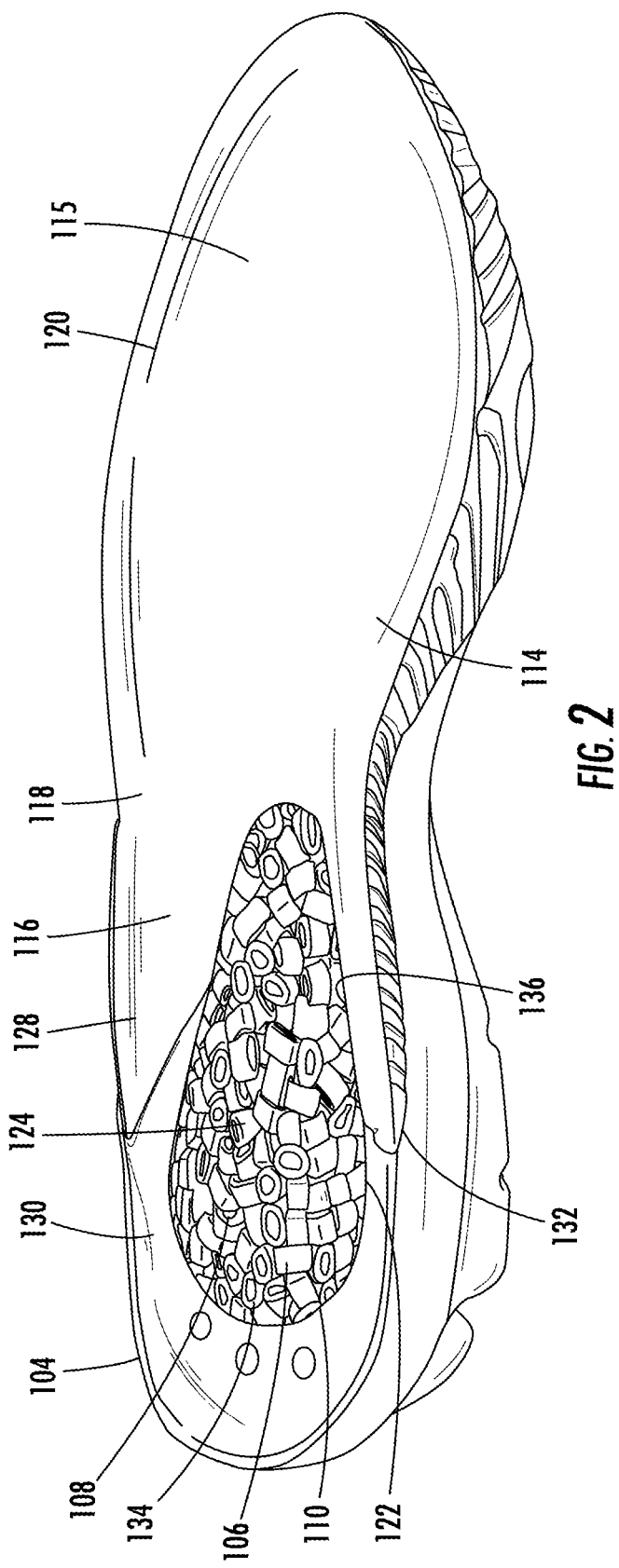
FIG. 2 is a top perspective view of the sole of FIG. 1.
Figure 3:
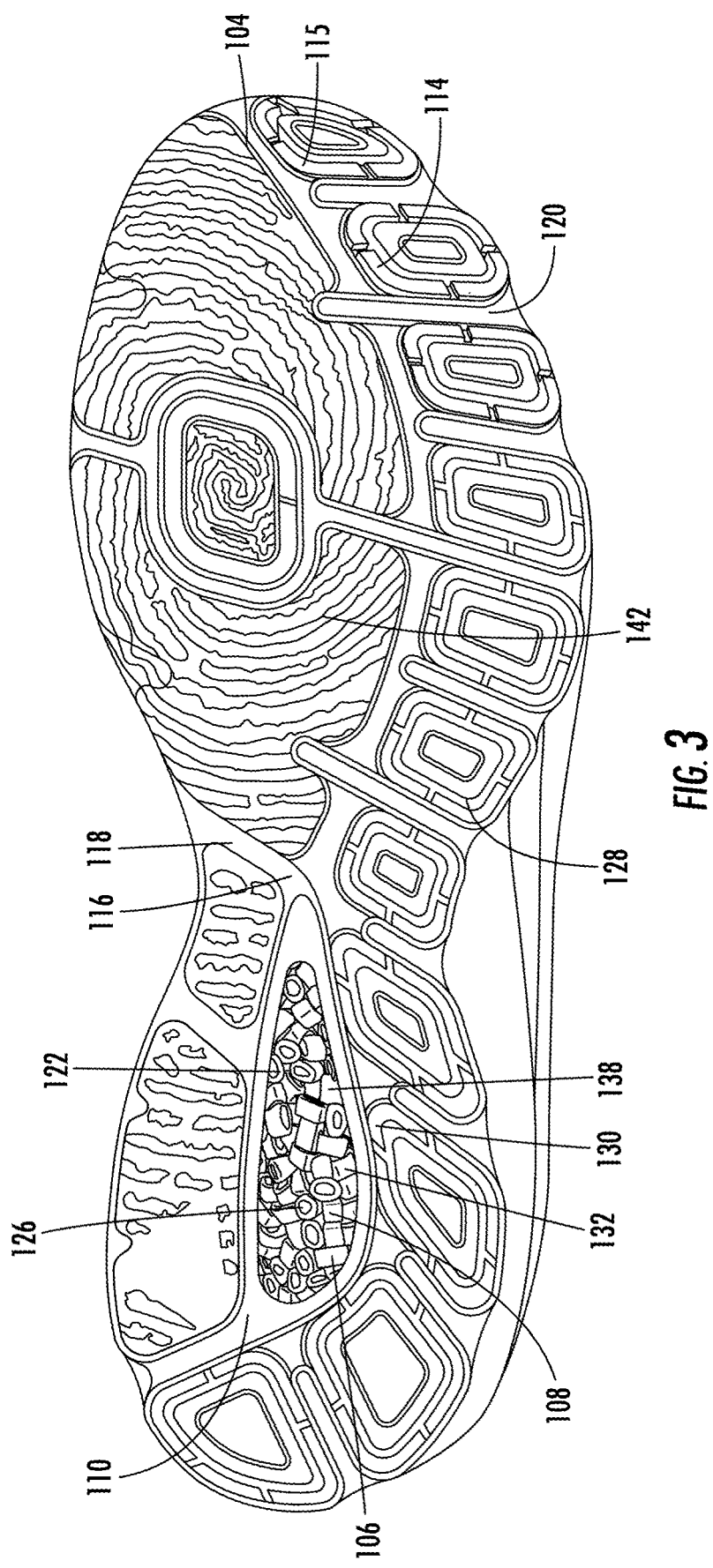
FIG. 3 is a bottom perspective view of the sole of FIG. 1.
Figure 4:
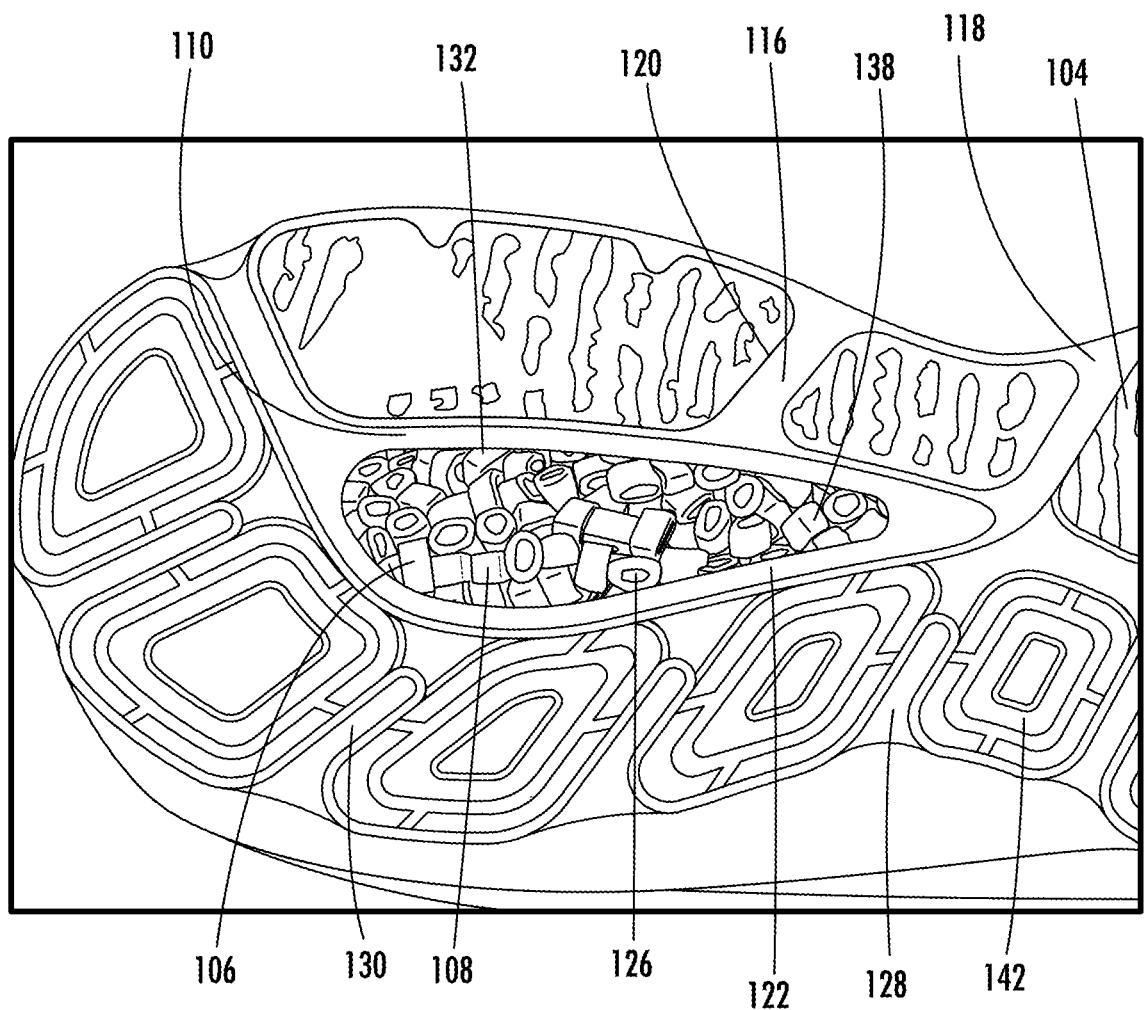
FIG. 4 is a partial bottom view of the sole of FIG. 1.
Figure 5:
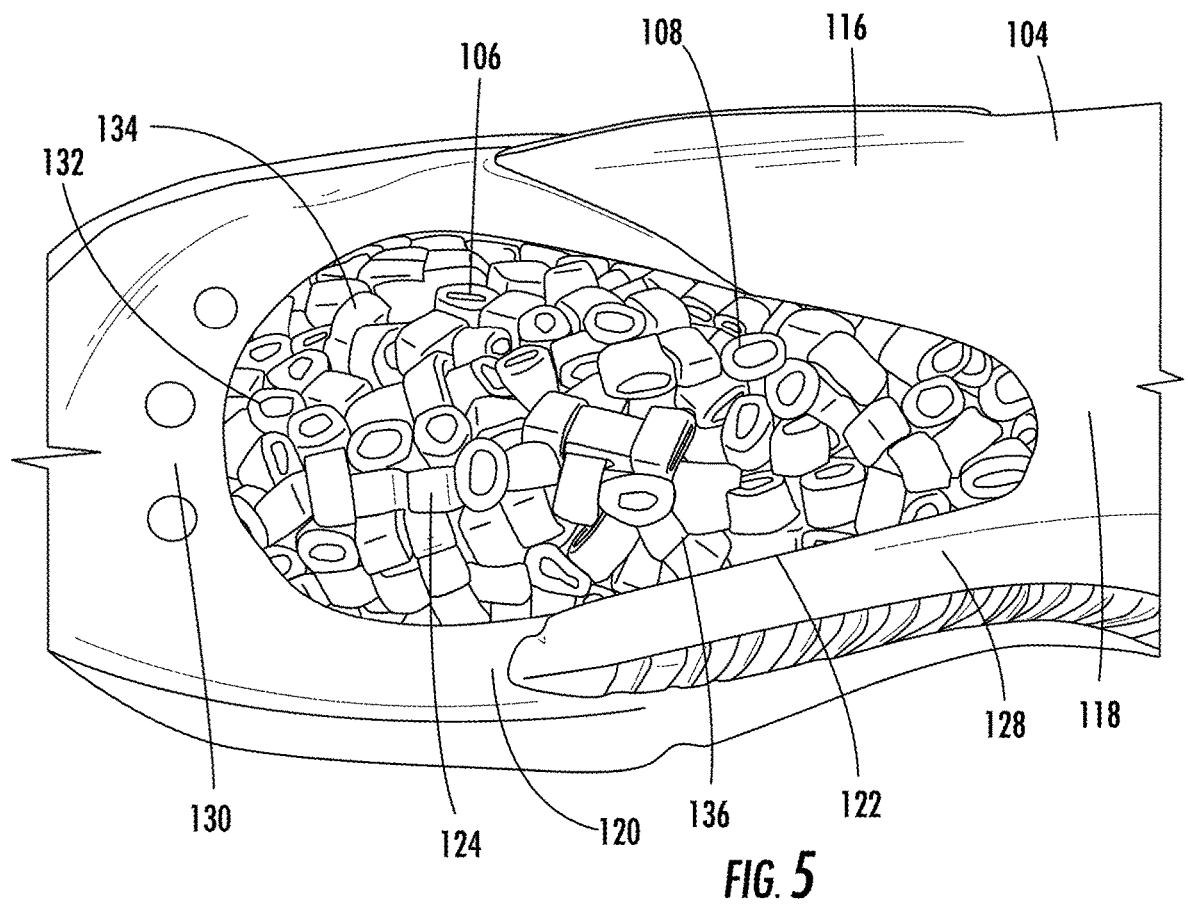
FIG. 5 is a partial top view of the sole of FIG. 1.
Figure 6:
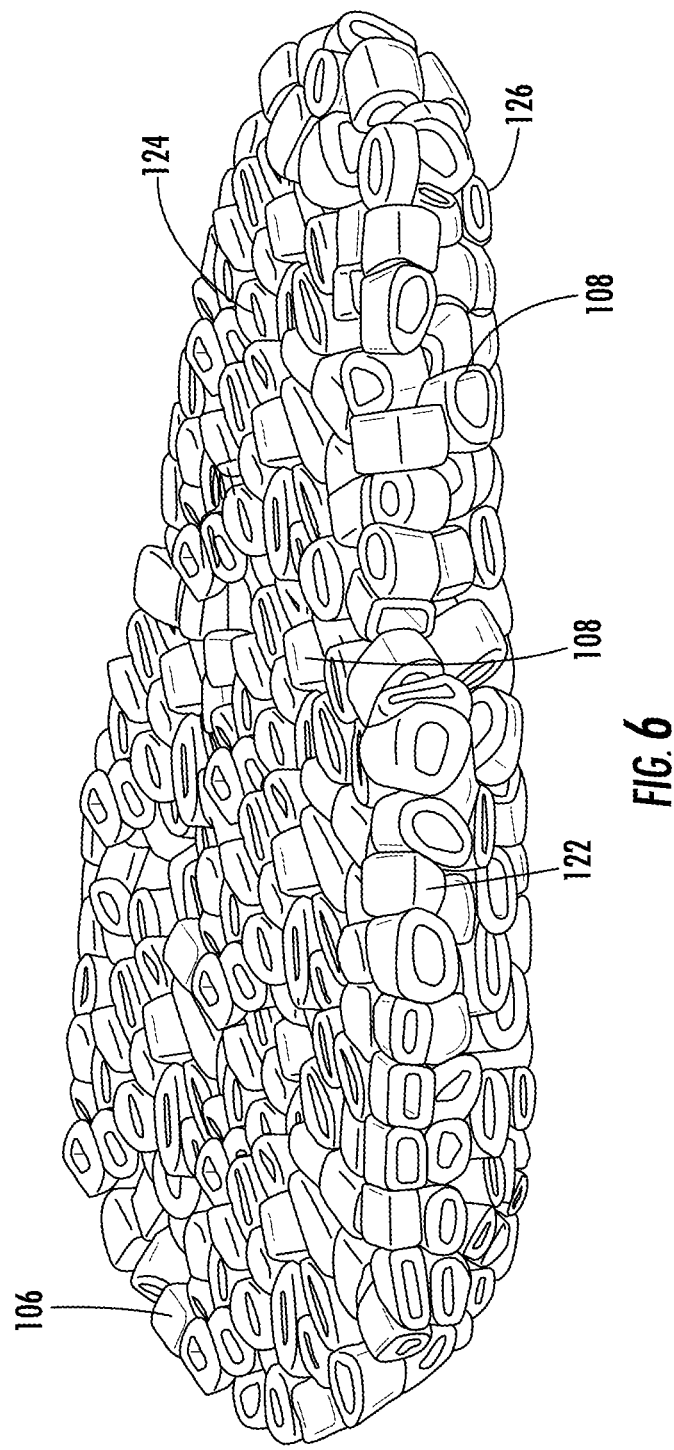
FIG. 6 is a top perspective view of a first region of the sole of FIG. 1.
Figure 7:
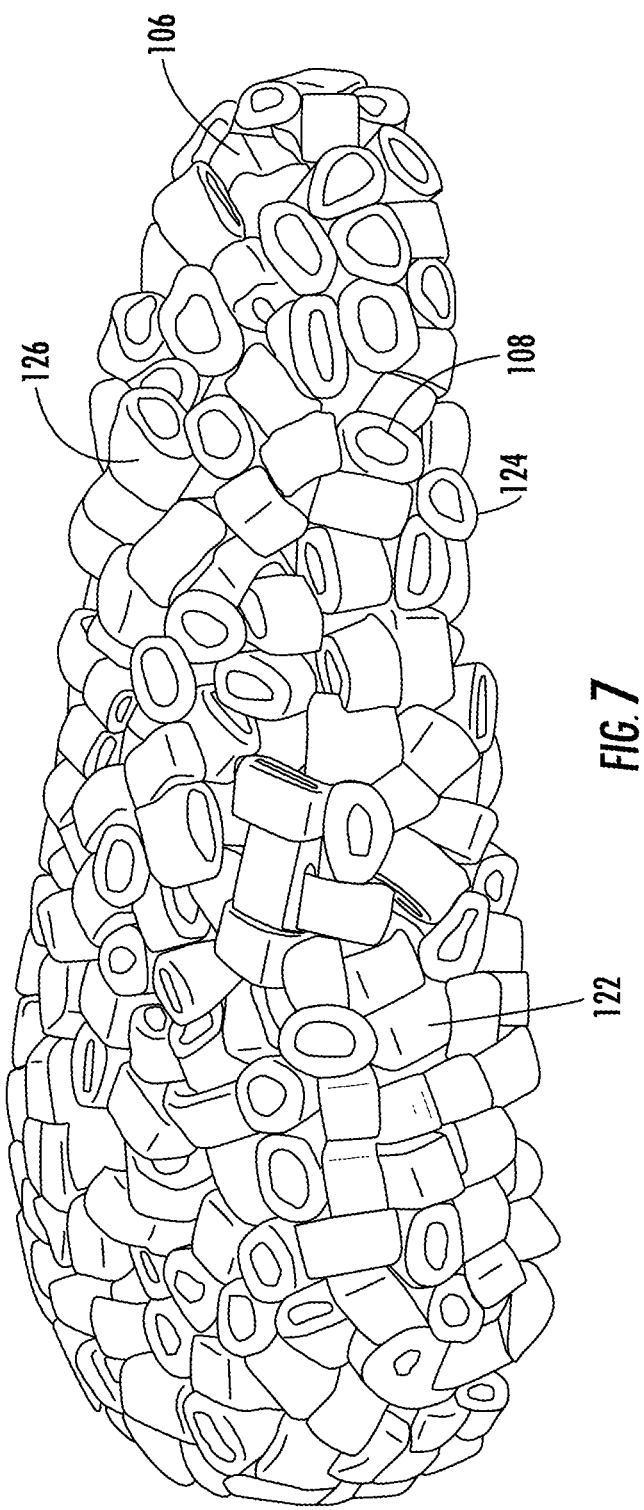
FIG. 7 is a bottom perspective view of a first region of the sole of FIG. 1.
Figure 8:
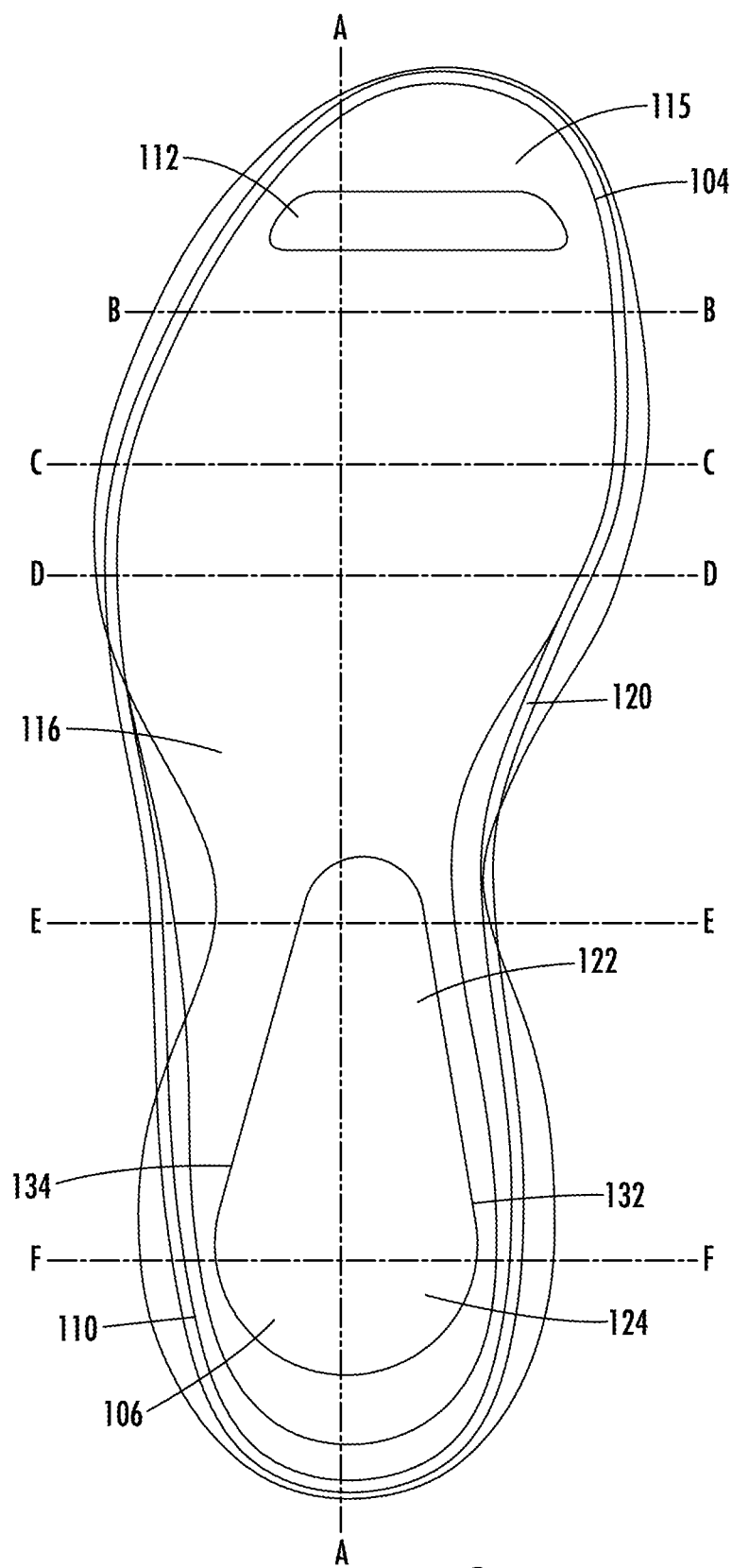
FIG. 8 is a top view of a sole, according to certain embodiments of the present invention.
Figure 9:
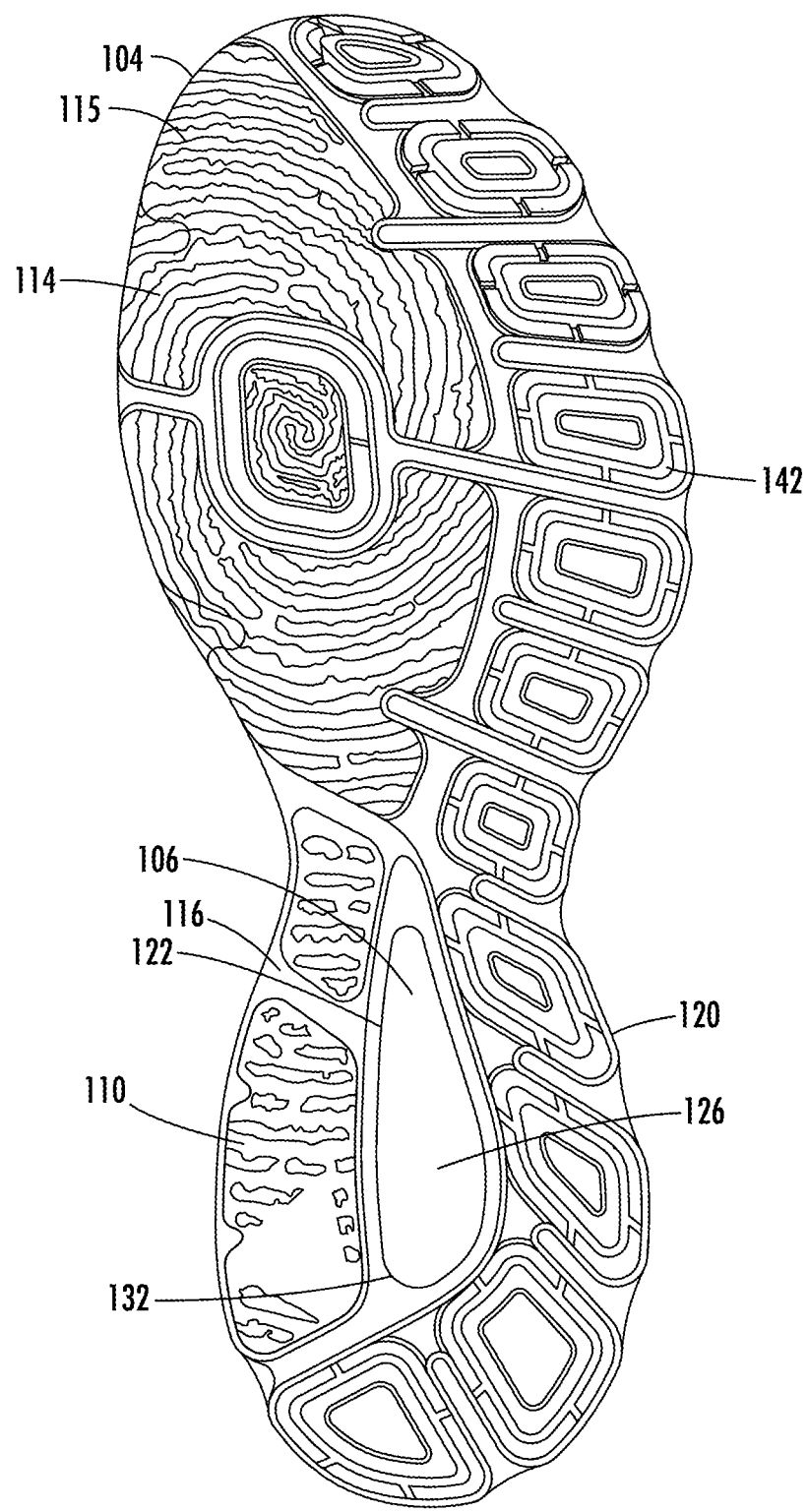
FIG. 9 is a bottom view of the sole of FIG. 8.
Figure 10:
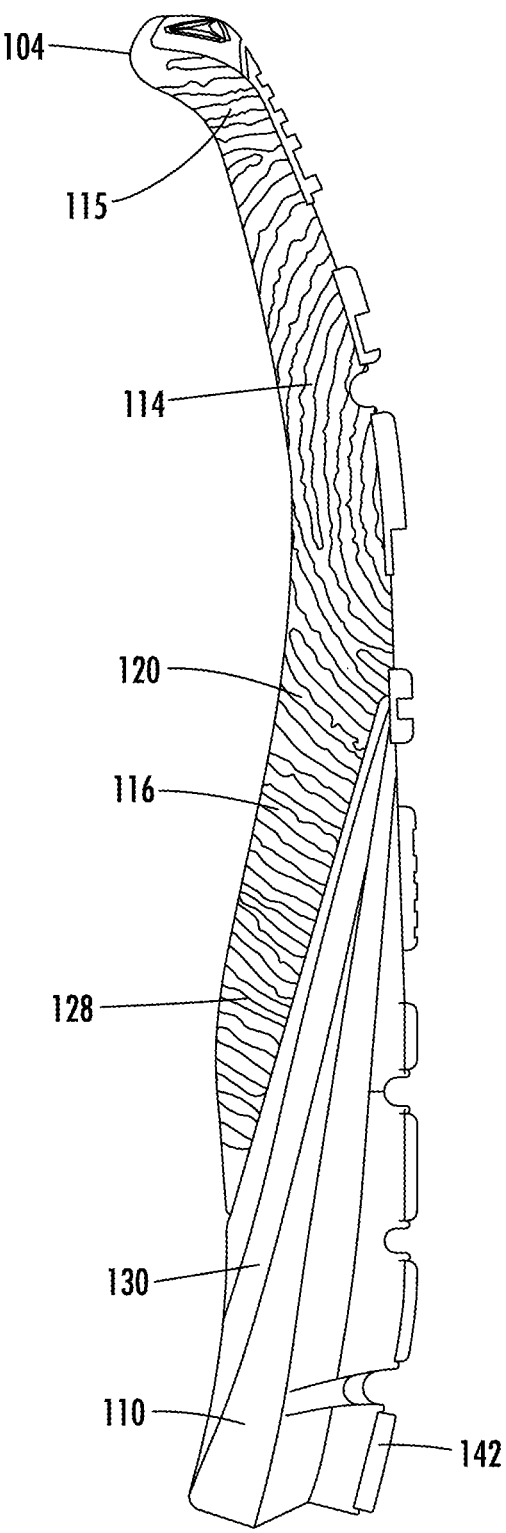
FIG. 10 is a medial view of the sole of FIG. 8.
Figure 11:
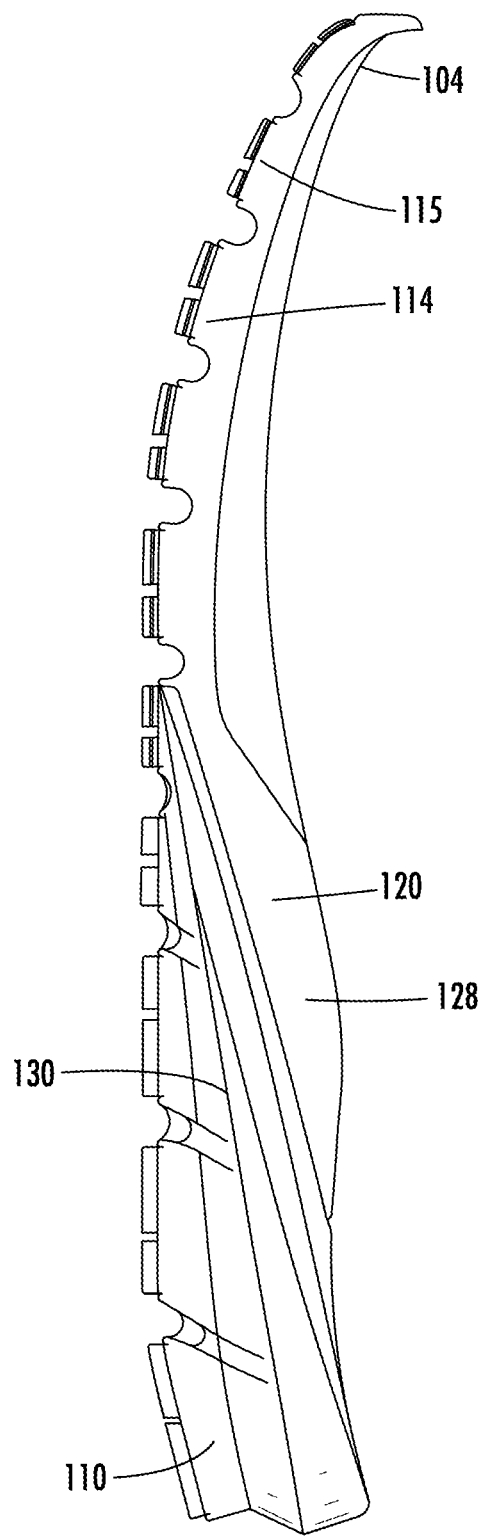
FIG. 11 is a lateral view of the sole of FIG. 8.
Figure 12:
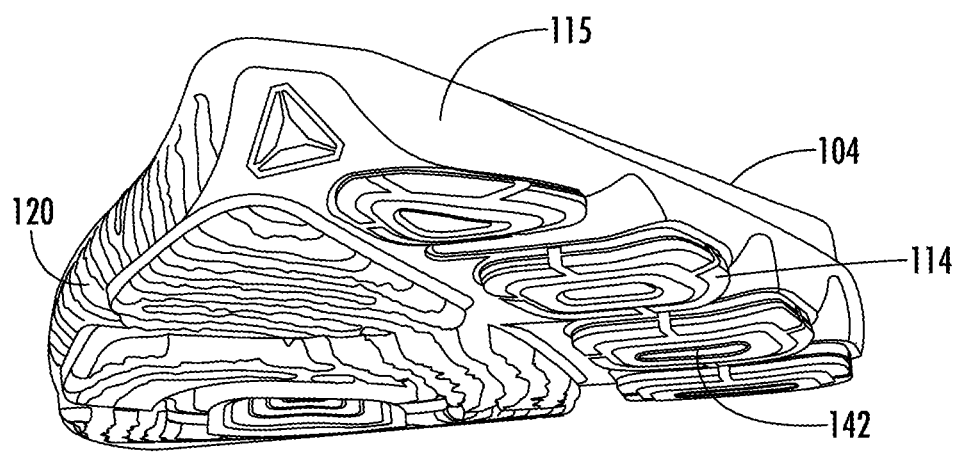
FIG. 12 is a front view of the sole of FIG. 8.
Figure 13:
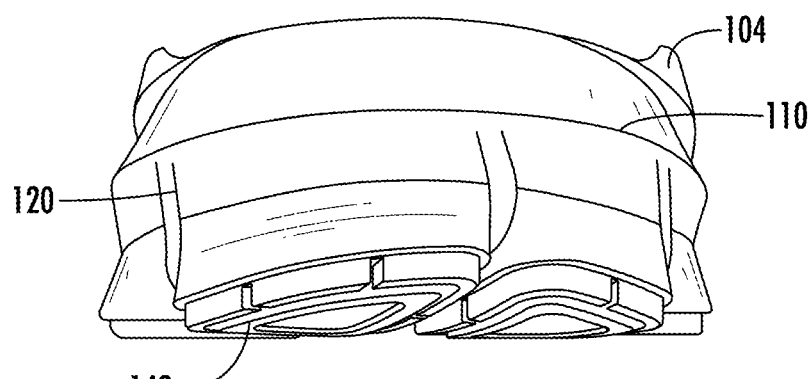
FIG. 13 is a rear view of the sole of FIG. 8.
Figure 14:
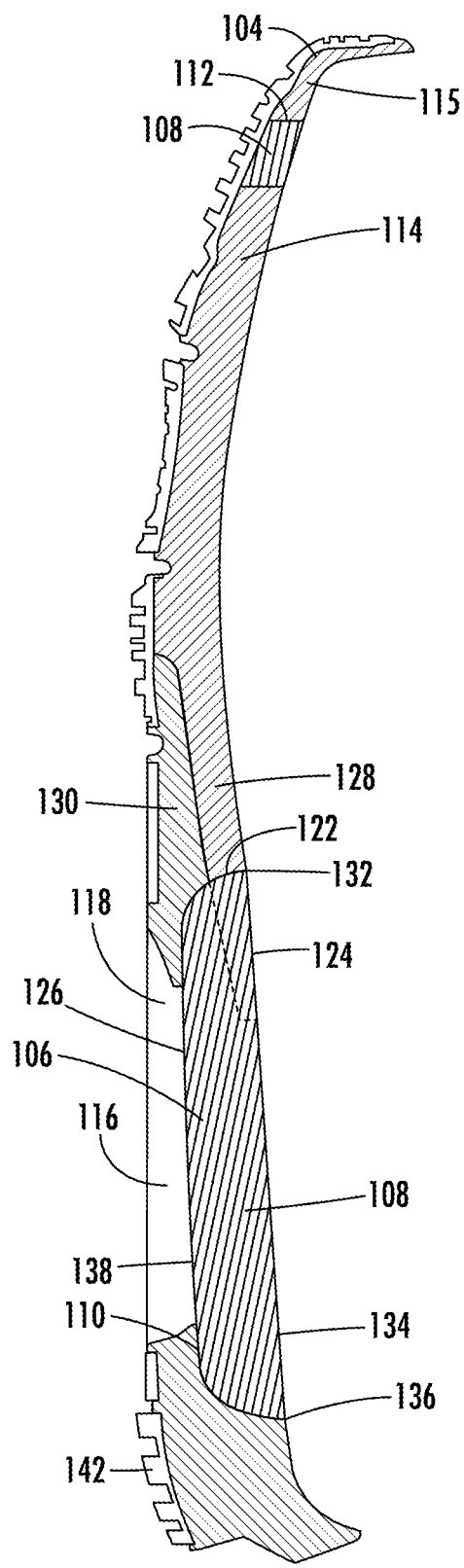
FIG. 14 is a cross-sectional view of the sole of FIG. 8 taken along Line A.
Figure 15:
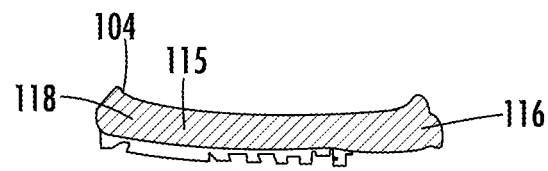
FIG. 15 is a cross-sectional view of the sole of FIG. 8 taken along Line B.
Figure 16:
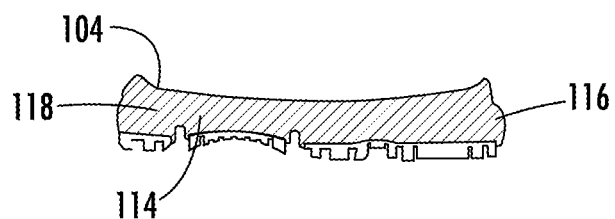
FIG. 16 is a cross-sectional view of the sole of FIG. 8 taken along Line C.
Figure 17:
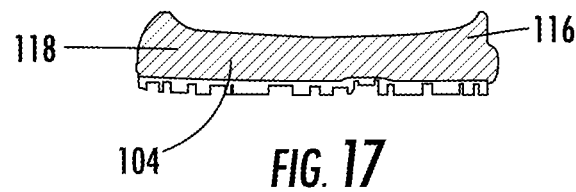
FIG. 17 is a cross-sectional view of the sole of FIG. 8 taken along Line D.
Figure 18:
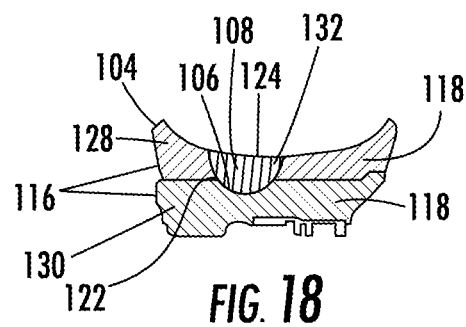
FIG. 18 is a cross-sectional view of the sole of FIG. 8 taken along Line E.
Figure 19:
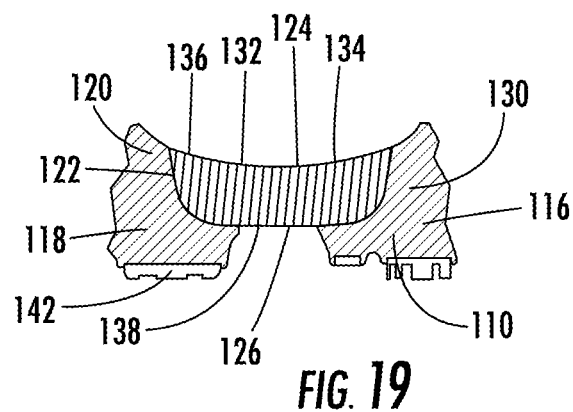
FIG. 19 is a cross-sectional view of the sole of FIG. 8 taken along Line F.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the subsequent detailed description, presently preferred embodiments of the present invention are described with respect to sports shoes. However, it is emphasized that the present invention is not limited to these embodiments. For example, the present invention may also be applied to shoes for work, leisure shoes or other shoes.

Sole Structure

According to certain embodiments of the present invention, as best illustrated in FIGS. 1-24, a shoe 100 comprises an upper 102 and a sole 104. The sole 104 comprises a first region 106, wherein the first region 106 comprises a composite material 108.

In some embodiments, as shown in FIGS. 1-24, the first region 106 is arranged in a heel area 110, and may further be arranged below the calcaneus. The first region 106 provides good cushioning in the heel area 110, which is typically the location of the first contact with the ground during walking or running. Thus, having improved cushioning below the heel area 110 dampens the impact of the foot hitting the ground.

In further embodiments, additional regions comprising the composite material 108 may be included in the sole 104. For example, a third region 112 of composite material 108 may be arranged in a forefoot area 114 or a toe area 115. The forefoot area 114 is often the last contact of the sole 104 with the ground before the foot is lifted off the ground. Having improved cushioning in the forefoot area 114 ensures that the energy lost due to impact of the foot on the ground may be recovered when the foot lifts off the ground. In other embodiments, the sole 104 may comprise only the first region 106, both first region 106 and third region 112, or more than two regions 106, 112.

In certain embodiments, the composite material 108 in the first region 106 may be a different composite material than the material used in the third region 112. For example, the composite material 108 used in the first region 106 may have a higher strength than the composite material 108 used in the third region 112.

The sole 104 also comprises a second region 116, which comprises a material 118 that is free of composite material 108. The material 118 may comprise ethylene-vinyl acetate ("EVA"), expanded polypropylene ("PP"), or other suitable material. In general, the material 118 should have a higher hardness value than the composite material 108 so as to provide a structure that supports and controls the direction of elastic expansion of the material 108. A suitable hardness value for material 118 may range from 80A to 85A, and may further range from 75A to 95A.

The second region 116 may be arranged around an outer rim 120 of the sole 104 and/or between the heel area 110 and the forefoot area 114. For example, for quick lateral movements, the outer rim 120 of the sole 104 experiences large loadings. Depending on the wearer, the large loading may occur on a medial side or lateral side of the sole 104. Providing the second region 116 in the locations that experience these large loadings provides additional stability to the sole 104. The second region 116 may be configured to border at least a portion of a side surface 122 of the first region 106. The second region 116 may be configured to leave a top surface 124 and/or a bottom surface 126 of the first region 106 unbordered by the second region 116 so that the first region 106 is free to expand in the direction of the unbordered surface(s).

In certain embodiments, the second region 116 may comprise more than one section. For example, as shown in FIGS. 1-24, the second region 116 may be divided into a front section 128 and a rear section 130. The front section 128 may be configured to border a portion of the side surface 122 of the first region 106, and the rear section 130 may be configured to border a remainder of the side surface 122 of the first region 106. The second region 116 may be configured to leave the top surface 124 and/or the bottom surface 126 of the first region 106 unbordered by the second region 116 so that the first region 106 is free to expand in the direction of the unbordered surface(s). The front section 128 and the rear section 130 may also be configured to mate with each other through an overlapping tapered design, as shown in best illustrated in FIGS. 10-11.

In certain embodiments, the second region 116 forms a pocket 132 that partially surrounds the first region 106. For example, the pocket 132 may have a larger opening 134 on a top side 136 such that the larger opening 134 does not enclose the top surface 124 of the first region 106. In contrast, the pocket 132 may have a smaller opening 138 on a bottom side 140, wherein the pocket 132 is shaped such that a portion of the bottom surface 126 of the first region 106 is covered by the pocket 132 while a remaining portion of the bottom surface 126 of the first region 106 is aligned with the smaller opening 138 and is thus not enclosed or covered by the pocket 132.

The sole 104 may optionally comprise an outsole 142. In some embodiments, the outsole 142 comprises rubber or non-expanded TPU. The outsole 142 provides the sole 104 with additional slip resistance and abrasion resistance. The outsole 142 may be bonded to the first region 106 and/or the second region 116 in a steaming process, as described in more detail below. In other embodiments, an outsole 142 is not included.

Composite Pellet Formation

The composite material 108 may comprise a base material 200 and an outer layer or capstock material 202. In certain embodiments, the base material 200 may be thermoplastic polyurethane ("TPU").

Figure 20:
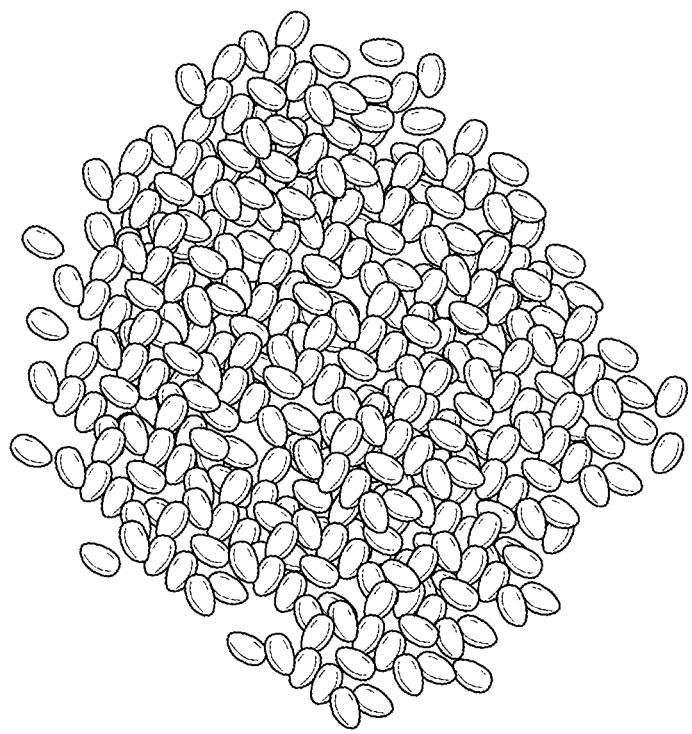
FIG. 20 is an image of TPU granules without a blowing agent.
Figure 21:
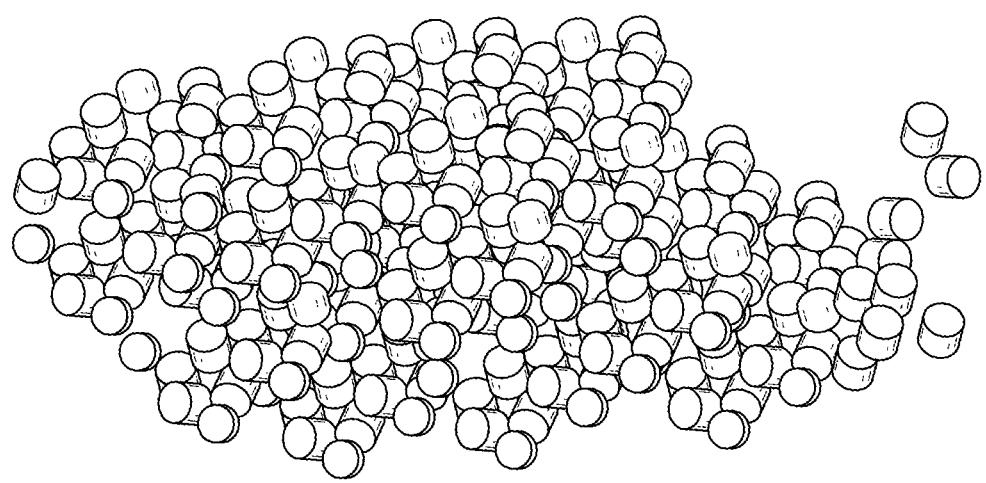
FIG. 21 is an image of TPU pellets with an unexpanded blowing agent contained therein.
Figure 22:
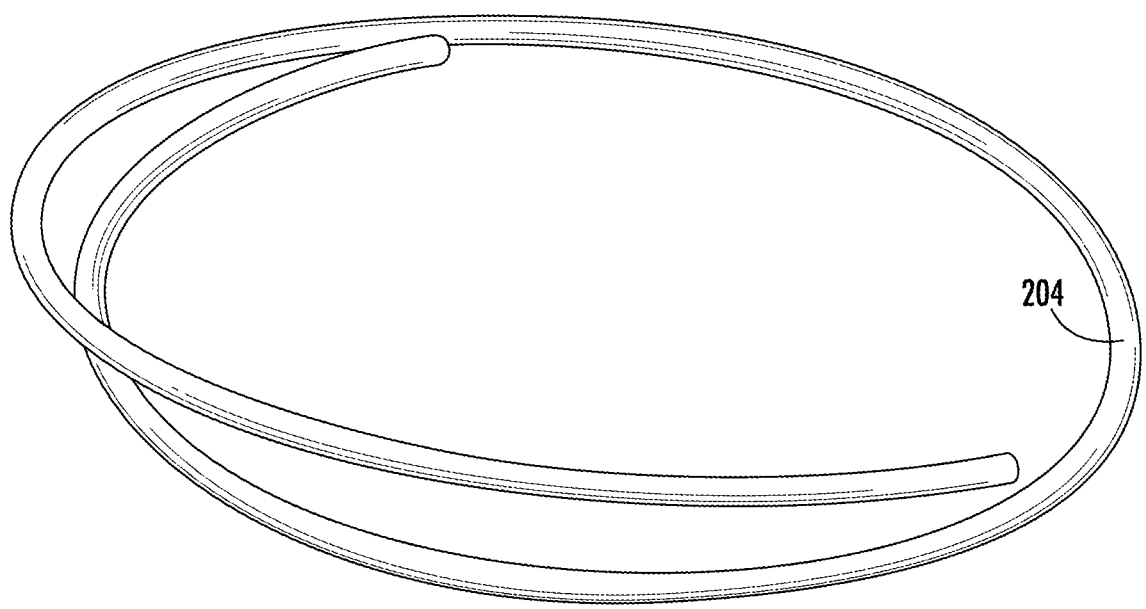
FIG. 22 is a perspective view of a hollow tube formed of a composite material.

As illustrated in FIG. 20, TPU in granular form (i.e., without a blowing agent) has a density of approximately 1110 kg/m$^3$. Thus, TPU granules have a density that is much higher than EVA, which is typically around 926-950 kg/m$^3$. In order to lower the density of TPU and thus reduce the weight of TPU, a blowing agent is included with the granular material so that the density of the final expanded material is much lower (i.e., approximately 110 kg/m$^3$). The TPU particles that include the blowing agent in a non-activated state are known as expandable TPU particles, as shown in FIG. 21. The blowing agent is mixed with the TPU granules in an extrusion process using a sufficiently low pressure and temperature such that the TPU pellets do not foam (expand).

Figure 25:
FIG. 25 is a diagram illustrating the process of forming the pellets of FIG. 24.

FIG. 25 illustrates a method, according to certain embodiments of the present invention, of forming the composite material 108 from expandable TPU particles.

Figure 23:
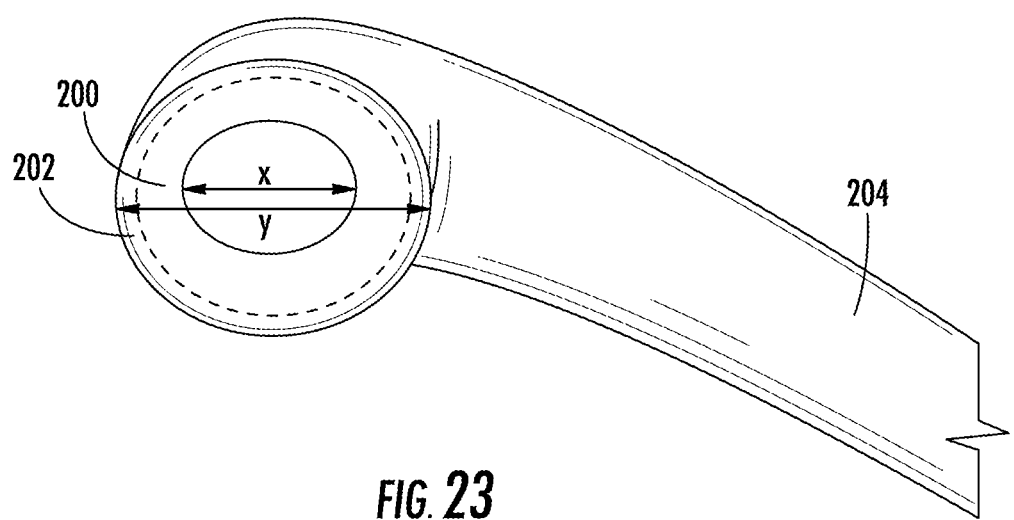
FIG. 23 is an end view of the hollow tube of FIG. 22.

As illustrated in FIG. 25, the expandable TPU particles are introduced into an extruder 300. In the extruder, the expandable TPU particles are pressurized and/or heated sufficiently to cause the blowing agent to foam the TPU particles, and the foamed TPU particles are extruded into a hollow tube 204. As illustrated in FIG. 23, the hollow tube 204 may have an inner diameter X of approximately 1.6 mm to 1.8 mm, and may further have an outer diameter Y of approximately 1.4 mm to 2.0 mm.

Figure 24:
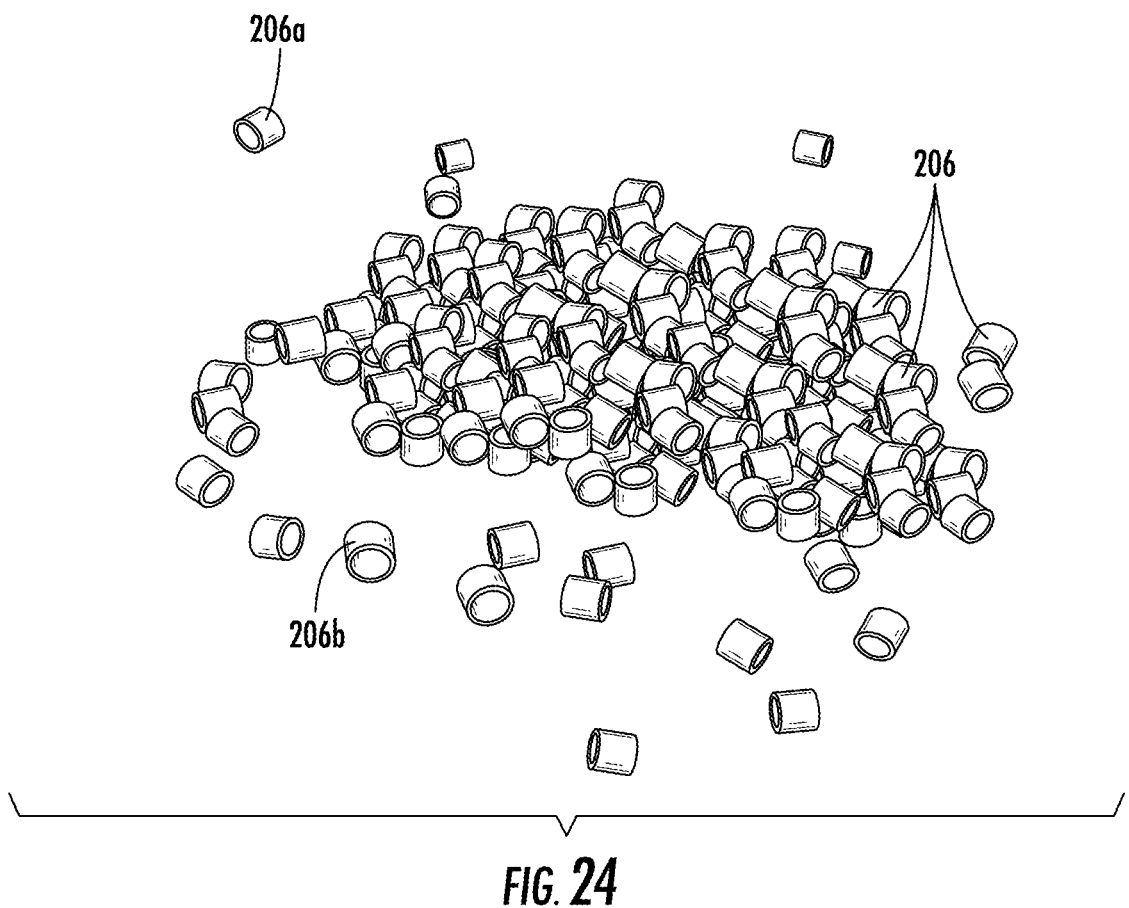
FIG. 24 is an image of pellets cut from the hollow tube of FIG. 22.

As illustrated in FIG. 25, to form pellets, the hollow tube 204 is fed into a cutting station 304, where the hollow tube 204 is cut into short segments or pellets 206. The segments or pellets 206 are typically around 2.5 mm to 3.5 mm in length, and may further be chopped into segments of around 2.0 mm to 7.0 mm in length. FIG. 24 illustrates these segments or pellets 206.

In some embodiments, as also illustrated in FIG. 25, the outer layer or capstock material 202 is applied to the hollow tube 204 in a capstock applicator 302 prior to introducing the hollow tube 204 into the cutting station 304. The capstock material 202 may be added as an outer layer to the hollow tube 204 to provide improved bonding strength between the pellets 206. A suitable range for bonding strength between the pellets 206 may range between 6 N/mm and 8 N/mm, and may further range between 3 N/mm and 9 N/mm.

The capstock material 202 may also be a TPU material with a lower melting temperature than the base material 200. Other suitable materials for the capstock material 202 may include but are not limited to BASF 880A13N, BASF AH576, or any other suitable material that provides a suitable bonding strength between the pellets 206. For example, the capstock material 202 may have a melting temperature of 119° C., and the base material 200 may have a melting temperature of 190° C. A person of ordinary skill in the relevant art will understand that any suitable materials may be used for the base material 200 and the capstock material 202 so long as the base material 200 has a melting temperature that is at least 40° C. higher than the melting temperature of the capstock material 202.

With a lower melting temperature, the capstock applicator 302 may melt the capstock material 202 over the hollow tube 204, thereby forming the composite material 108. Although typically thinner than the base material 200, the capstock material 202 may increase the overall thickness of the hollow tube 204 such that the outer diameter may range between 100 microns and 150 microns, and may further range between 50 microns and 200 microns. Other methods of applying the capstock material 202 to the hollow tube 204 include but are not limited to multi-die co-extrusion.

Shoe Sole Formation

Figure 26:
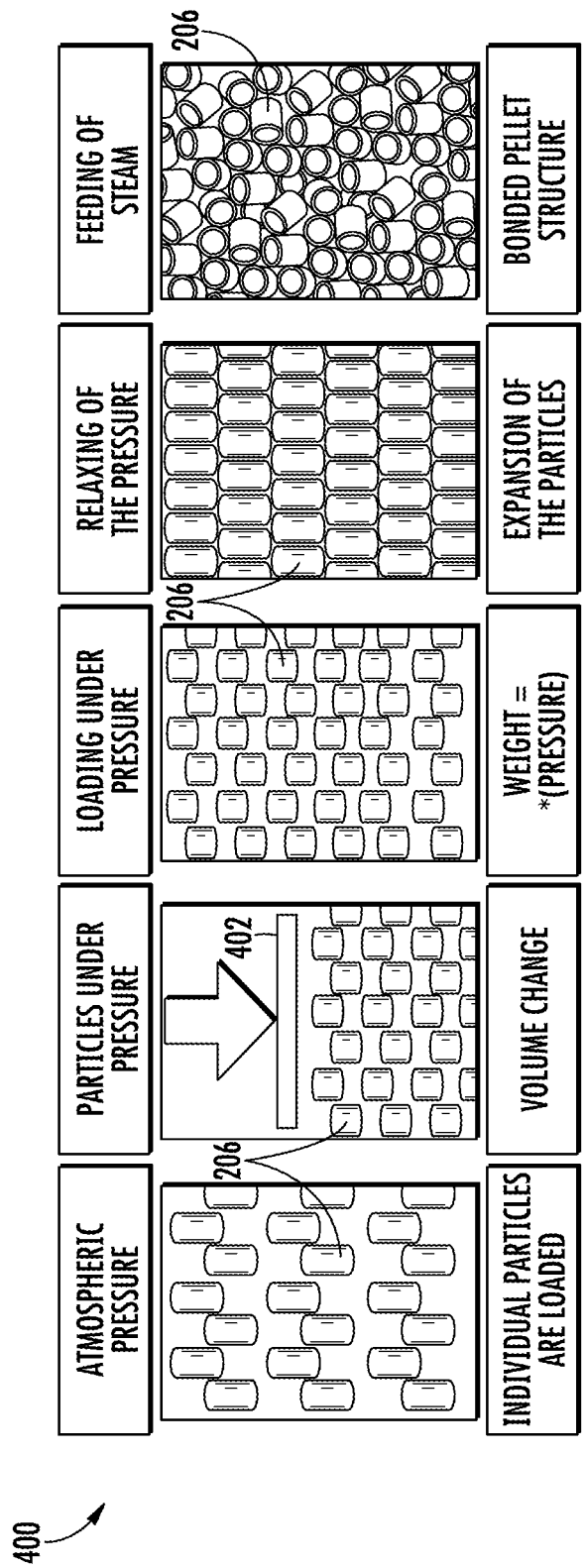
FIG. 26 is a diagram illustrating a method of manufacturing a sole for a shoe, according to certain embodiments of the present invention.

A method of forming the sole 104 using the pellets 206, according to certain embodiments of the present invention, is illustrated in FIG. 26. The method comprises loading a mold 400 with the pellets 206. In some embodiments, the pellets 206 are first loaded into the mold 400 at atmospheric pressure. Subsequently, the pellets 206 are pressurized within the mold 400. To this end, a variety of different methods may be used. For example, the pressure may be increased by reducing the volume of the mold 400. In some embodiments, a moveable part 402 of the mold 400 is moved such that the volume of the mold 400 is reduced. In further embodiments, the mold 400 is designed such that the pressure within the mold 400 is locally increased. In other embodiments, the pellets 206 are loaded into the mold 400 under pressure. The pressure to which the particles are compressed influences the density and the strength of the bonds between the pellets 206. With higher pressures, the pellets 206 are compressed to have a higher density. The mold 400 may be pressurized to a range of 0.4 bar to 1.0 bar.

The pressure is then relaxed, which allows the pellets 206 to at least partially expand back to their original hollow tube shapes.

Steam is then fed into the mold 400, which heats the surfaces of the pellets 206 until the outer layers of capstock material 202 are partially melted or melted. Because of the difference in melting temperatures, pressure and temperature are adjusted within the mold 400 so that the capstock material 202 melts or partially melts to join the pellets 206 to one another, while the base material 200 retains its original shape without melting or partially melting.

In some embodiments, the method also comprises loading the mold 400 with the material 118 that is free of the pellets 206 to form the second region 116 within the sole 104. In certain embodiments, the material 118 is loaded into the mold 400 first, and the pellets 206 are loaded second. However, the sequence of loading may be reversed. In addition, several loading steps with pellets 206 and/or with material 118 and/or with other materials may be carried out in the mold 400. The sequence of steps may be optimized differently in different embodiments.

Furthermore, the pellets 206 may be fed into the mold 400 to form the third region 112 and/or additional regions. The pellets 206 forming the third region 112 may have the same or different properties as the pellets 206 forming the first region 106. Furthermore, the steam may be fed to the third region 112 at a different temperature and/or rate than the steam fed to the first region 106, thereby causing the pellets 206 in the third region 112 to have different properties based on the fabrication method. The steam may be fed to each region sequentially and/or simultaneously.

The described methods may be automatized to a large degree that provides for a cost-effective and efficient production. Moreover, the problematic usage of glue is unnecessary and may harm the environment and the workers in the shoe production. Thus, in certain embodiments, only steam is added in the production process. In some embodiments, the steam is essentially free from additives.

Figure 27:
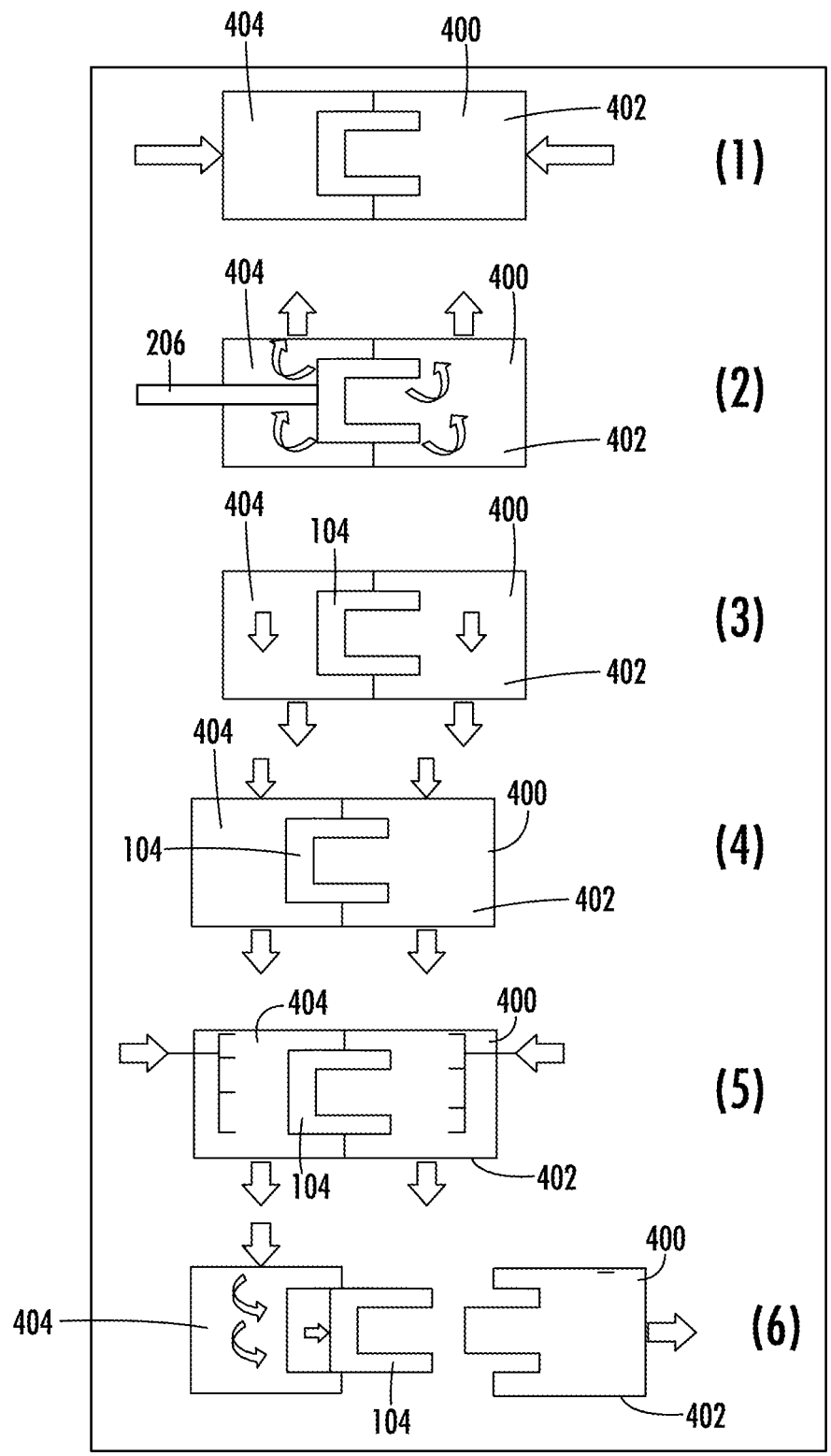
FIG. 27 is a diagram illustrating a method of manufacturing a sole for a shoe, according to certain embodiments of the present invention.

FIG. 27 shows further embodiments for a method for manufacturing the sole 104 that comprises a loading the mold 400 with expanded TPU under increased pressure. In the first step, the mold 400 is closed and pre-treated with steam. Thus, for example, the mold 400 may be cleaned. In the second step, the mold 400 is loaded with pellets 206, wherein the loading is carried out under pressure. In the third step, the pressure relaxes within the mold 400. In the fourth step, steam is fed to the pellets 206 such that the surfaces of the pellets 206 partially melt and the pellets 206 chemically bond to each other. In addition, the method comprises, in the fifth step, cooling the mold 400 with water and/or air fed through the mold 400. Thus, the pellets 206 are cooled indirectly via the mold 400. Finally, in the sixth step, the mold 400 is re-opened and the sole 104, which comprises the pellets 206, is removed from the mold 400.

Figure 28:
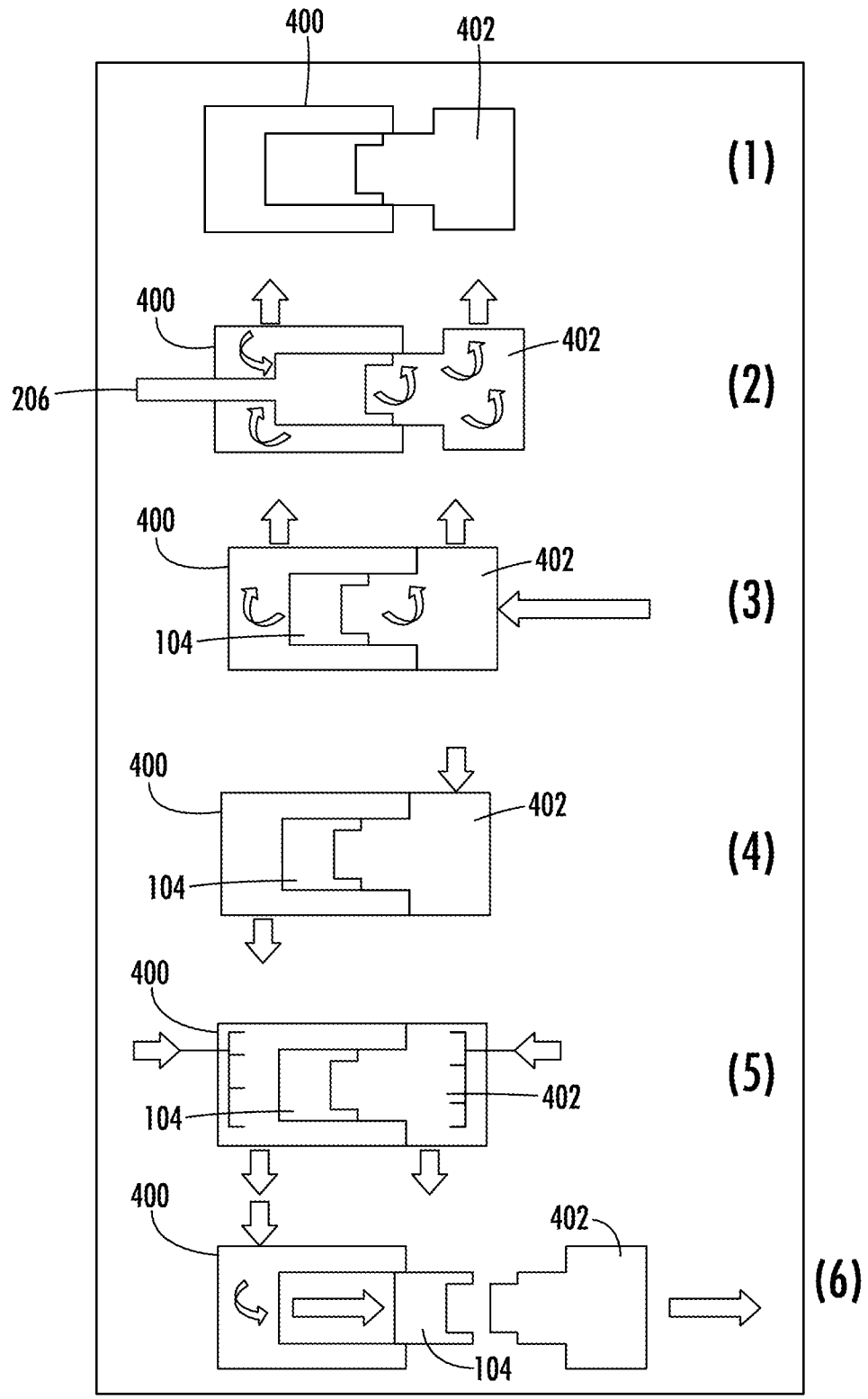
FIG. 28 is a diagram illustrating a method of manufacturing a sole for a shoe, according to certain embodiments of the present invention.

FIG. 28 shows further embodiments for a method for manufacturing the sole 104, which comprises a loading of a mold 400 with pellets 206 under atmospheric pressure.

In the first step, the mold 400, which comprises the movable part 402, is opened to a predetermined extent. The mold 400 is loaded with pellets 206 at atmospheric pressure in the second step. In the third step, the volume of the mold 400 is reduced according to the predetermined shape of the element that is to be manufactured and which comprises pellets 206. The extent to which the mold 400 is opened and, thus, the amount of pellets 206 that are available for compression is essential to achieve the desired mechanical properties for the first region 106. In other words, the weight, the strength, and the elasticity of the first region 106 may be determined by the extent to which the mold 400 is opened. The extent to which the mold 400 is opened is also correspondingly adapted to the size of the shaped part. In some embodiments, the mold 400 is opened to a height of about 14 mm for loading, which generates a medium weight and a medium strength for the first region 106. If the weight of the first region 106—for the same geometry—is to be reduced and/or it is to be designed softer, the mold 400 may be opened in the range of for example about 10 mm to about 14 mm. For a larger weight and a harder element, the mold 400 may, in some embodiments, be opened up to about 20 mm. In other embodiments, the height of the opening of the mold 400 depends on the shoe size. For larger shoe sizes, by trend, larger forces are to be expected, such that the pellets 206 correspondingly may be arranged with higher strength. Correspondingly, the mold 400 is opened to a larger extent for larger shoe sizes.

In the fourth step, steam is fed to the pellets 206. The outer surfaces of the pellets 206 are partially melted. In these embodiments, steam is fed to the pellets 206 while the mold 400 is being closed. In other embodiments, the third and fourth steps may be carried out sequentially. In the fifth step, the mold 400 is cooled by means of water and/or air and thus indirectly cools the pellets 206. In the sixth step, the mold 400 is finally opened and the sole 104 is removed from the mold 400.

In other embodiments, the steps of the mentioned methods for manufacturing the sole 104 may be combined. Also, individual method steps may be left out or may be carried out in a different order.

FIGS. 29-32 show embodiments for molds 400 that may be used for one of the mentioned methods for manufacturing the sole 104.

Figure 29:
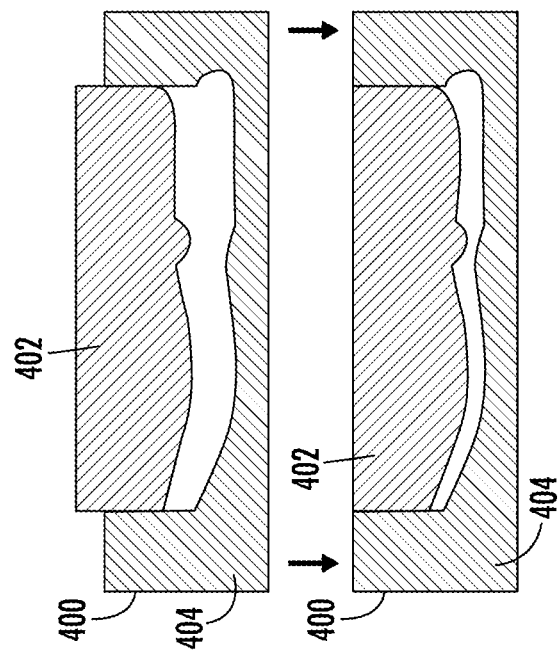
FIG. 29 illustrates a mold in an open state and closed state, respectively, for use in various embodiments of a method for manufacturing a shoe sole, according to certain embodiments of the present invention.

FIG. 29 shows an example for a mold 400 in an opened and a closed state. The mold 400 comprises the moveable part 402 and a fixed element 404. In some embodiments, the mold 400 is opened to a predetermined extent and loaded with pellets 206. Subsequently, the moveable element 402 is moved towards the fixed element 404 such that the pellets 206 are compressed. The mold 400 is closed to a predetermined extent, which determines the thickness of the shaped element that comprises the pellets 206. In these embodiments, steam is fed to the pellets 206 during the process of closing. The two elements 402 and 404 are arranged such that their shape determines the geometry of the shaped element that comprises pellets 206.

Figure 30:
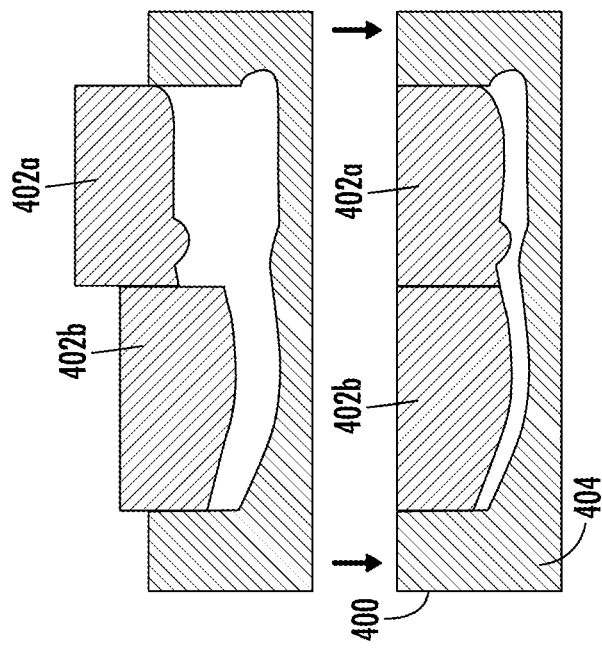
FIG. 30 illustrates a mold in an open state and closed state, respectively, for use in various embodiments of a method for manufacturing a shoe sole, according to certain embodiments of the present invention.

FIG. 30 shows a further example of the mold 400. In addition to the fixed element 404, the mold 400 comprises a first moveable element 402a and a second moveable element 402b. The number of two moveable elements is only an example and other molds 400 may comprise more than two moveable elements. The different moveable elements 402a and 402b allow opening the mold to different extents in different regions. Thus, for example in the region below the element 402a, which is opened to a larger extent than element 402b, a higher density may be provided after closing the mold than in the region below the element 402a. Thus, for example the region 106 of the sole 104 may be provided with a higher mass and a higher strength in the heel area 110 than the third region 112 in the forefoot area 114 or a toe area 115.

Figure 31:
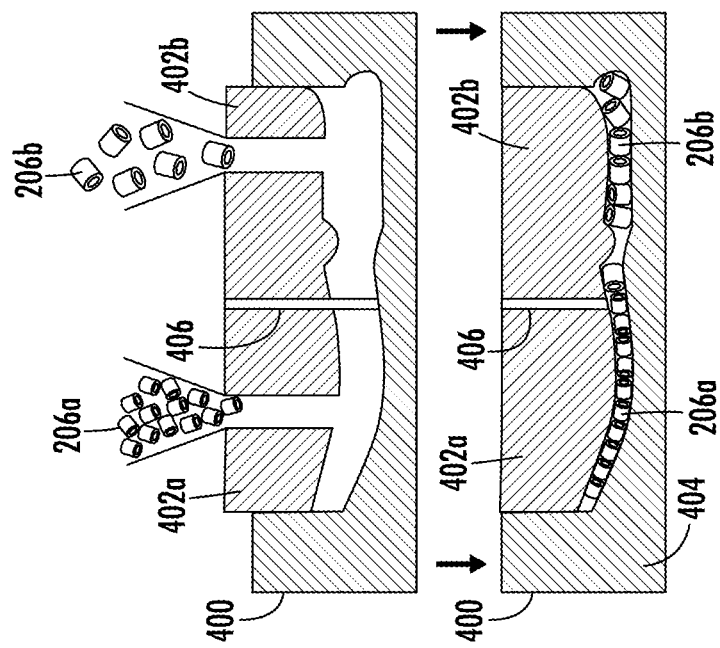
FIG. 31 illustrates a mold in an open state and closed state, respectively, for use in various embodiments of a method for manufacturing a shoe sole, according to certain embodiments of the present invention.

FIG. 31 illustrates an embodiment of the mold 400, which, in addition to the fixed element 404, also comprises two moveable elements 402a and 402b. Moreover, the mold 400 comprises a separating element 406 that separates the regions below the elements 402a and 402b. Thus, the regions below the elements 402a and 402b may be advantageously loaded with different base materials, for example, first pellets 206a and second pellets 206b. The first and the second pellets 206a, 206b may for example comprise a different size and/or color and/or composition. For example, the first pellets 206a may be formed of the composite material 108, and the second pellets 206a may be formed of a different composite material. In other embodiments, the first pellets 206a may be formed from a hollow tube 204 having a larger inner diameter, and the second pellets 206b may be formed from a hollow tube 204 having a smaller inner diameter or vice versa. Furthermore, the first pellets 206a may be formed by cutting longer linear segments from the hollow tube 204, and the second pellets 206b may be formed by cutting shorter linear segments from the hollow tube 204 or vice versa.

The separating element 406 prevents the first pellets 206a and the second pellets 206b from mixing during the loading. In some embodiments, the separating element 406 is removed prior to compressing in order to connect the regions below elements 402a and 402b. In other embodiments, the separating element 406 is removed after compressing. In both embodiments, the first pellets 206a and the second pellets 206b may be merged such that a bonding between the first pellets 206a and the second pellets 206b is provided. In some embodiments, the moveable elements 402a and 402b may also be opened to different extents prior to loading.

Figure 32:
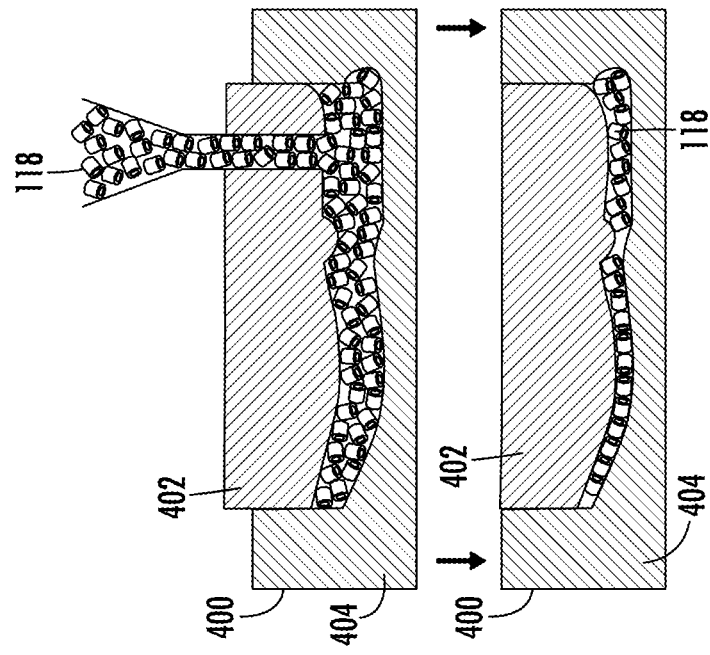
FIG. 32 illustrates a mold in an open state and closed state, respectively, for use in various embodiments of a method for manufacturing a shoe sole, according to certain embodiments of the present invention.

FIG. 32 illustrates further embodiments of the mold 400, which comprises a fixed element 404 and a moveable element 402. In addition to pellets 206, the mold may also be loaded with material 118, which is free from pellets 206. The material 118 may be incorporated to form a functional element, for example, a torsion bar within the sole 104.

In other embodiments, the mold 400 may be loaded with pre-formed functional elements prior to loading the pellets 206. In these embodiments, the material 118 and/or the pre-formed functional element(s) is loaded into the mold 400 prior to loading the pellets 206. In some embodiments, several materials or pre-formed functional element(s) that are free from pellets 206 may be loaded into the mold 400. After merging, the mold 400 may be opened and loaded once again. As a result, one or more additional steaming processes may be carried out in order to provide further regions that comprise pellets 206 or which are free from pellets 206 on top of each other.

Figure 33:
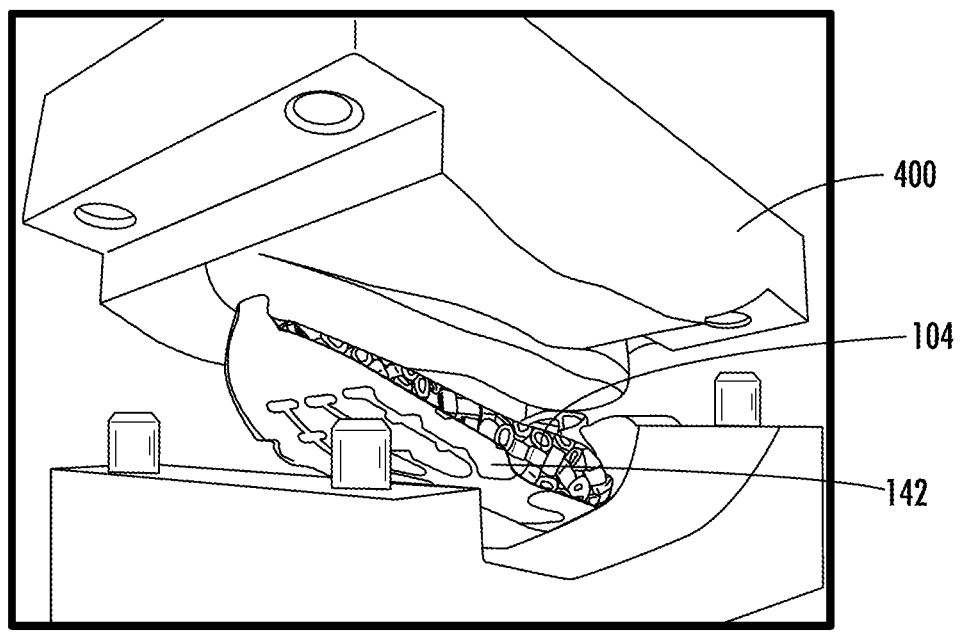
FIG. 33 is a perspective view of a mold in an open state for use in various embodiments of a method for manufacturing a shoe sole, according to certain embodiments of the present invention.

FIG. 33 is a three-dimensional view of a further embodiment of the mold 400, which comprises the fixed element 404 and the moveable element 402. Moreover, FIG. 33 shows the sole 104 that is manufactured within the mold 400. As described above with respect to FIGS. 1-24, the sole 104 comprises the first region 106 that comprises the pellets 206, the outsole 142, and the second region 116. In some embodiments, the outsole 142 and the pre-formed second region 116 are loaded into the mold 400. The mold 400 is then loaded with the pellets 206. The mold 400 is closed and steam is fed to the pellets 206 such that the capstock material 202 is partially melted in order to bond with the second region 116 and/or the outsole 142.

The features of the mold 400 and the method steps associated therewith may, in some embodiments, also be combined in an arbitrary manner.

Figure 34:
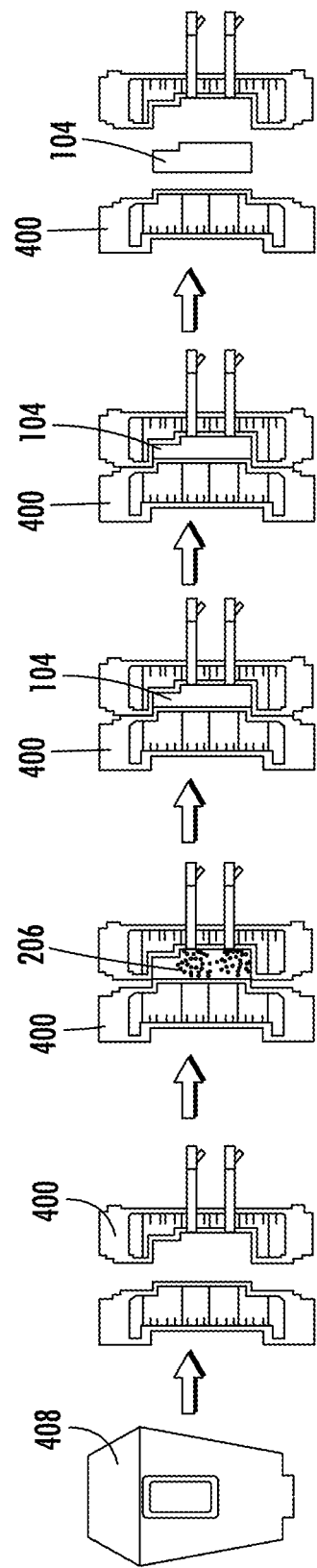
FIG. 34 is a diagram illustrating a method of manufacturing a sole for a shoe according to certain embodiments of the present invention.

FIG. 34 shows another example of a method for steam molding the sole 104, comprising the steps of (1) loading material into a hopper vessel 408, (2) closing the mold 400, (3) filling the mold cavities via pressure and/or through a crack via crack fill with the material to be molded, for example the pellets 206, (4) steaming the material within the mold 400, (5) cooling and stabilizing the steamed material, and (6) demolding.

Each of the mentioned methods for manufacturing a sole for a shoe may also comprise curing the pellets 206. For example, the properties of the pellets 206 may be influenced by parameters of the added steam. First, the temperature of the added steam may influence the strength of the bonding between the pellets 206. Higher steam temperatures may result in stronger bonding of the pellets 206. Additionally, the strength of the bonding may be controlled via the duration of the steaming process.

In certain embodiments, the duration of the method comprises about 3-15 minutes. The duration may further comprise about 3-6 minutes for less elaborate methods, wherein only a few different materials and/or elements are used. For methods that involve a plurality of materials and/or elements, the duration may comprise up to about 15 minutes.

A higher initial pressure, which is used for compressing the pellets 206, may lead to a higher density of the regions 106, 112, and/or other regions comprising the pellets 206. The densities of the pellets 206 may vary from about 0.17-0.19 grams/liter, and may further vary from about 0.24 to about 0.26 grams/liter.

Slower cooling of the pellets 206 may also stabilize the structure of the regions 106, 112, and/or other regions comprising the pellets 206. Thus, a higher long-term stability is achieved. Also, by curing the pellets 206, the structure may be stabilized, wherein the curing temperature and curing duration influence the structure stability.

In total, a large flexibility for controlling the properties of the expanded TPU is provided. Flexibility may be achieved by both changing the base material and by changing the manufacturing parameters as well as by adjusting the base materials and the manufacturing parameters to each other. In particular, the manufacturing parameters, such as the extent of opening the mold, the temperature and pressure, may be changed very easily and quickly such that the manufacturing process may be provided in a very flexible and quickly changeable manner.

In the following, further examples are described to facilitate the understanding of the invention:

1. A sole for a shoe comprising:
   a region comprising a plurality of pellets, each pellet having a hollow core structure;
   wherein the plurality of pellets are formed of a composite material comprising a base layer and an outer layer, the base layer formed of a material having a first melting temperature, and the outer layer is formed of a material having a second melting temperature, wherein the first melting temperature is greater than the second melting temperature; and
   wherein the plurality of pellets are bonded through melting of the outer layers while the inner layers retain the hollow core structure without melting.
2. The sole of any preceding example, wherein the region is positioned in a heel area of the sole.
3. The sole of any preceding example, wherein the first melting temperature is at least 40° C. higher than the second melting temperature.
4. The sole of any preceding example, further comprising a second region bordering at least a portion of a side surface of the region comprising the plurality of pellets, wherein the second region is free of the plurality of pellets.
5. The sole of example 4, wherein the second region is configured to leave at least a portion of a top surface of the region comprising the plurality of pellets unbordered.
6. The sole of example 4 or 5, wherein the second region is configured to leave at least a portion of a bottom surface of the region comprising the plurality of pellets unbordered.
7. The sole of any of examples 4-6, wherein the second region forms a pocket that partially surrounds the region comprising the plurality of pellets.
8. The sole of any preceding example, wherein the pellets comprise an inner diameter of approximately 1.6 mm to 1.8 mm.
9. A sole for a shoe comprising:
   a first region comprising a plurality of pellets, each pellet having a hollow core structure, wherein the plurality of pellets are formed of a composite material comprising a base layer and an outer layer, wherein the pellets are bonded through melting of the outer layers;
   a second region bordering at least a portion of a side surface of the first region, wherein the second region is free of the plurality of pellets.
10. The sole of example 9, wherein the first region is positioned in a heel area of the sole.
11. The sole of example 9 or 10, wherein the second region is arranged around an outer rim of the sole.
12. The sole of any of examples 9-11, wherein the base layer is formed of a material having a first melting temperature, and the outer layer is formed of a material having a second melting temperature, wherein the first melting temperature is greater than the second melting temperature.
13. The sole of any of examples 9-12, wherein the inner layers of the pellets retain the hollow core structure without melting.
14. The sole of example 12, wherein the first melting temperature is at least 40° C. higher than the second melting temperature.
15. The sole of any of examples 9-14, wherein the second region is configured to leave at least a portion of a top surface of the first region unbordered.
16. The sole of any of examples 9-15, wherein the second region is configured to leave at least a portion of a bottom surface of the first region unbordered.
17. The sole of any of examples 9-16, wherein the second region forms a pocket that partially surrounds the first region.
18. The sole of any preceding example, wherein the pellets comprise an inner diameter of approximately 1.6 mm to 1.8 mm.
19. A method of forming a shoe sole comprising:
   introducing a plurality of pellets into a mold, each pellet having a hollow core structure, the plurality of pellets formed of a composite material comprising a base layer and an outer layer, the base layer formed of a material having a first melting temperature, and the outer layer having a second melting temperature, wherein the first melting temperature is greater than the second melting temperature;
   introducing steam into the mold; and
   joining the pellets to one another to form at least a region of the shoe sole.
20. The method of example 19, wherein the mold is pressurized after introduction of the plurality of pellets.
21. The method of example 19 or 20, wherein the plurality of pellets are introduced into a pressurized mold.
22. The method of any of examples 19-21, wherein the mold is pressurized to a range of 0.4 bar to 1.0 bar.
23. The method of any of examples 19-22, further comprising cooling the mold.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sole for a shoe comprising:
   a region comprising a plurality of pellets, each pellet having a hollow core structure and an opening therethrough;
   wherein the hollow core structure is surrounded by a material comprising a base layer and an outer layer,
   wherein the outer layer has a lower melting temperature than the base layer; and
   wherein the plurality of pellets are directly bonded to one another at their outer layers while the inner layers retain the hollow core structure.
2. The sole according of claim 1, wherein the region is positioned in a heel area of the sole.

3. The sole according of claim 1, wherein the first melting temperature is at least 40° C. higher than the second melting temperature.

4. The sole according of claim 1, further comprising a second region bordering at least a portion of a side surface of the region comprising the plurality of pellets, wherein the second region is free of the plurality of pellets.

5. The sole according of claim 4, wherein the second region is configured to leave at least a portion of a top surface of the region comprising the plurality of pellets unbordered.

6. The sole according of claim 4, wherein the second region forms a pocket that partially surrounds the region comprising the plurality of pellets.

7. The sole according of claim 1, wherein the pellets comprise an inner diameter of approximately 1.6 mm to 1.8 mm.

8. A sole for a shoe comprising:
a region comprising a plurality of pellets, each pellet having a hollow core structure and an opening therethrough;
wherein the hollow core structure is surrounded by a material comprising a base layer and an outer layer; and
wherein the plurality of pellets are directly bonded to one another at their outer layers while the inner layers retain the hollow core structure.

9. The sole of claim 8, wherein the region is positioned in a heel area of the sole.

10. The sole according of claim 8, further comprising a second region bordering at least a portion of a side surface of the region comprising the plurality of pellets, wherein the second region is free of the plurality of pellets.

11. The sole of claim 10, wherein the second region is arranged around an outer rim of the sole.

12. The sole of claim 10, wherein the base layer is formed of a material having a first melting temperature, and the outer layer is formed of a material having a second melting temperature, wherein the first melting temperature is greater than the second melting temperature.

13. The sole of claim 10, wherein the first melting temperature is at least 40° C. higher than the second melting temperature.

14. The sole of claim 10, wherein the second region is configured to leave at least a portion of a top surface of the first region unbordered.

15. The sole of claim 10, wherein the second region is configured to leave at least a portion of a bottom surface of the first region unbordered.

16. The sole of claim 10, wherein the second region forms a pocket that partially surrounds the first region.

17. The sole of claim 8, wherein the pellets comprise an inner diameter of approximately 1.6 mm to 1.8 mm.

* * * * *